(12) United States Patent
Zhou et al.

(10) Patent No.: US 12,323,611 B2
(45) Date of Patent: Jun. 3, 2025

(54) VIDEO DECODING APPARATUS AND VIDEO DECODING METHOD

(71) Applicant: SHARP KABUSHIKI KAISHA, Sakai (JP)

(72) Inventors: Tianyang Zhou, Sakai (JP); Tomohiro Ikai, Sakai (JP); Eiichi Sasaki, Sakai (JP); Yukinobu Yasugi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/122,622

(22) Filed: Mar. 16, 2023

(65) Prior Publication Data

US 2023/0224485 A1    Jul. 13, 2023

Related U.S. Application Data

(63) Continuation of application No. 17/311,302, filed as application No. PCT/JP2019/046959 on Dec. 2, 2019, now Pat. No. 11,641,479.

(30) Foreign Application Priority Data

Dec. 7, 2018   (JP) ................. 2018-229864

(51) Int. Cl.
*H04N 19/44*    (2014.01)
*H04N 19/119*   (2014.01)
*H04N 19/176*   (2014.01)
*H04N 19/186*   (2014.01)
*H04N 19/96*    (2014.01)

(52) U.S. Cl.
CPC .......... *H04N 19/44* (2014.11); *H04N 19/119* (2014.11); *H04N 19/176* (2014.11); *H04N 19/186* (2014.11); *H04N 19/96* (2014.11)

(58) Field of Classification Search
None
See application file for complete search history.

(56) References Cited

U.S. PATENT DOCUMENTS

2021/0235099 A1* 7/2021  Park ................ H04N 19/176
2021/0377525 A1* 12/2021 Lim ................. H04N 19/136

OTHER PUBLICATIONS

Benjamin Bross et al., "Versatile Video Coding (Draft 2)", JVET-K1001 v6, Joint Video Experts Team (JVET) of ITU-T SG 16 WP 3 and ISO/IEC JTC 1/SC 29/WG 11, 11th Meeting: Ljubljana, S1, Jul. 10-18, 2018 (Year: 2018).*

(Continued)

*Primary Examiner* — Kaitlin A Retallick
(74) *Attorney, Agent, or Firm* — ScienBiziP, P.C.

(57) ABSTRACT

In conventional cases that different trees are used between luma and chroma and that luma chroma prediction including multiplication in chroma intra prediction is used, there is a problem in that a processing delay caused by the chroma intra prediction is increased in small blocks. In a case that two different trees are used between luma and chroma, in a case of an 8×8 block in a luma size, 0 is derived without decoding qt_split_cu_flag, and in a case of an 8×4/4×8 block in a luma size, 0 is derived without decoding mtt_split_cu_flag. In a case that the size of a target block is smaller than a prescribed size, a chroma intra mode is derived from any one of DC, leftward prediction, and upward prediction.

3 Claims, 32 Drawing Sheets

(56) References Cited

OTHER PUBLICATIONS

C. Rosewarne et al., "CEI-related: Chroma block coding and size restriction", JVET-L0129_rl, Joint Video Experts Team (JVET) of ITU-T SG 16 WP 3 and ISO/IEC JTC 1/SC 29/WG 11, 12th Meeting: Macao, CN, Oct. 3-12, 2018 (Year: 2018).*

Tianyang Zhou et al., "Non-CE3: Intra chroma partitioning and prediction restriction", JVET-M0065, Joint Video Exploration Team (JVET) of ITU-T SG 16 WP 3 and ISO/IEC JTC 1SC 29/WG 11, 13th Meeting: Marrakesh, MA, Jan. 9-18, 2019.

C. Rosewarne et al., "CEI-related: Chroma block coding and size restriction", JVET-L0129_rl, Joint Video Experts Team (JVET) of ITU-T SG 16 WP 3 and ISO/IEC JTC 1/SC 29/WG 11, 12th Meeting: Macao, CN, Oct. 3-12, 2018.

Benjamin Bross et al., "Versatile Video Coding (Draft 2)", JVET-K1001 v6, Joint Video Experts Team (JVET) of ITU-T SG 16 WP 3 and ISO/IEC JTC 1/SC 29/WG 11, 11th Meeting: Ljubljana, S1, Jul. 10-18, 2018.

Benjamin Bross et al., "Versatile Video Coding (Draft 3)", JVET-L1001 v2, Joint Video Experts Team (JVET) of ITU-T SG 16 WP 3 and ISO/IEC JTC 1/SC 29/WG 11, 12th Meeting: Macao, CN, Oct. 3-12, 2018.

Non-final Rejection dated Feb. 7, 2022 for U.S. Appl. No. 17/311,302 which is the parent application of the Instant application.

Notice of Allowance dated Dec. 23, 2022 for U.S. Appl. No. 17/311,302 which is the parent application of the instant application.

* cited by examiner (a)
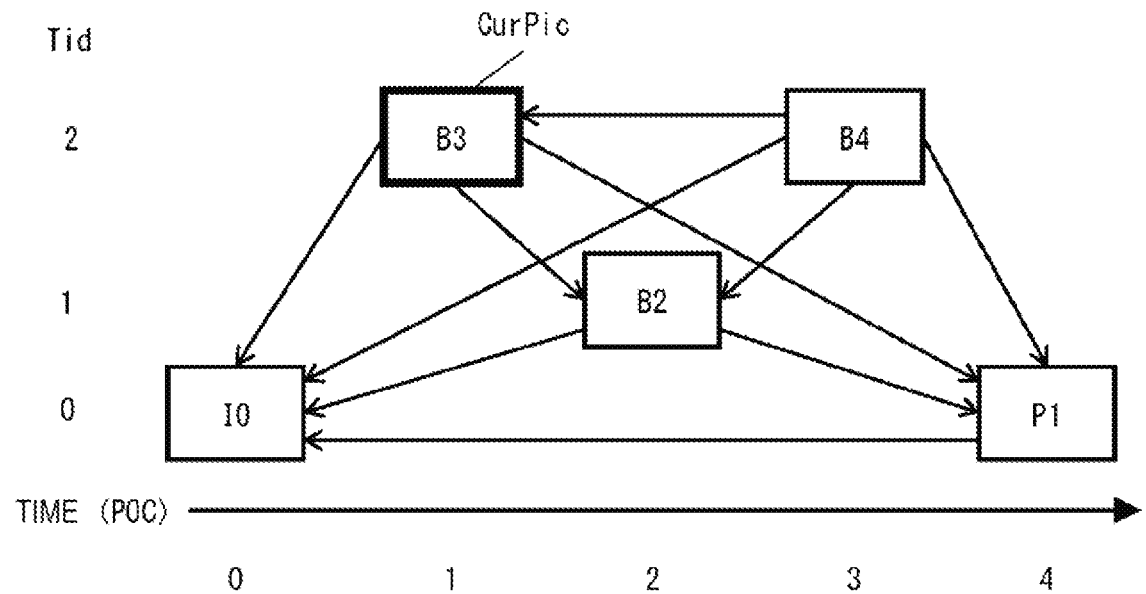
(b)
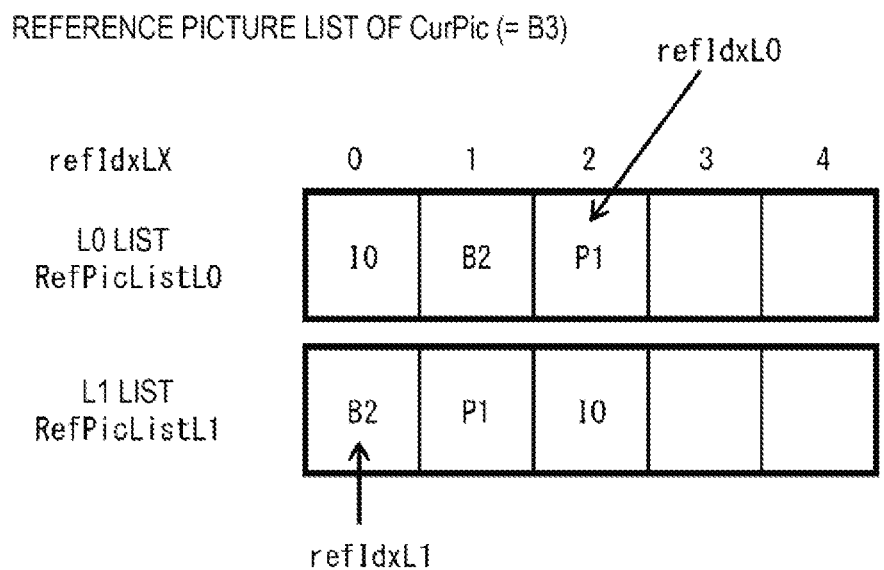
FIG. 6

(a)

| coding_tree_unit( ) { | Descriptor | |
|---|---|---|
| xCtb = ( CtbAddrInRs % PicWidthInCtbsY )<<CtbLog2SizeY | | |
| yCtb = ( CtbAddrInRs / PicWidthInCtbsY )<<CtbLog2SizeY | | |
| if( slice_sao_luma_flag \|\| slice_sao_chroma_flag ) | | |
|   sao( xCtb >> CtbLog2SizeY, yCtb >> CtbLog2SizeY ) | | |
| if( slice_type = = I && qtbtt_dual_tree_intra_flag ) | | ←SYN1400 |
|   dual_tree_implicit_qt_split( xCtb, yCtb, CtbLog2SizeY, 0 ) | | |
| else | | |
|   coding_quadtree( xCtb, yCtb, CtbLog2SizeY, 0, SINGLE_TREE ) | | |
| } | | |

(b)

| coding_quadtree( x0, y0, log2CbSize, cqtDepth, treeType ) { | Descriptor | |
|---|---|---|
| qt_split_cu_flag[ x0 ][ y0 ] | ae(v) | ←SYN1421 |
| minQtSize = ( treeType = = DUAL_TREE_CHROMA ) ? MinQtSizeC : MinQtSizeY | | |
| maxBtSize = ( treeType = = DUAL_TREE_CHROMA ) ? MaxBtSizeC : MaxBtSizeY | | |
| if ( ( ( x0 + ( 1 << log2CbSize ) <= pic_width_in_luma_samples ) ? 1 : 0 ) + <br> ( ( y0 + ( 1 << log2CbSize ) <= pic_height_in_luma_samples ) ? 1 : 0 ) + <br> ( ( ( 1 << log2CbSize ) <= maxBtSize ) ? 1 : 0 ) ) >= 2 && <br> ( 1 << log2CbSize ) > minQtSize ) | | |
| qt_split_cu_flag[ x0 ][ y0 ] | ae(v) | |
| if( qt_split_cu_flag [ x0 ][ y0 ] ) { | | ←SYN1431 |
|   x1 = x0 + ( 1<<( log2CbSize − 1 ) ) | | |
|   y1 = y0 + ( 1<<( log2CbSize − 1 ) ) | | |
|   coding_quadtree( x0, y0, log2CbSize − 1, cqtDepth + 1 ) | | ←SYN1451A |
|   if( x1 < pic_width_in_luma_samples ) | | |
|     coding_quadtree( x1, y0, log2CbSize − 1, cqtDepth + 1 ) | | ←SYN1451B |
|   if( y1 < pic_height_in_luma_samples ) | | |
|     coding_quadtree( x0, y1, log2CbSize − 1, cqtDepth + 1 ) | | ←SYN1451C |
|   if( x1 < pic_width_in_luma_samples && y1 < <br> pic_height_in_luma_samples ) | | |
|     coding_quadtree( x1, y1, log2CbSize − 1, cqtDepth + 1 ) | | ←SYN1451D |
| } else | | |
|   multi_tree_type( x0, y0, 1<<log2CbSize, 1<<log2CbSize, 0 ) | | |
| } | | |

FIG. 10

| multi_type_tree( x0, y0, cbWidth, cbHeight, mttDepth, doft, partIdx, treeType ) { | Descriptor |
|---|---|
| if( ( allowSplitBtVer \|\| allowSplitBtHor \|\| allowSplitTtVer \|\| allowSplitTtHor ) && ( x0 + cbWidth <= pic_width_in_luma_samples ) && (y0 + cbHeight <= pic_height_in_luma_samples ) ) | |
|     mtt_split_cu_flag | ae(v) |
| if( mtt_split_cu_flag ) { | |
|   if((allowSplitMtt)) | |
|     mtt_split_cu_vertical_flag | ae(v) |
|   if((allowSplitBtVer && allowSplitTtVer && mtt_split_cu_vertical_flag ) \|\| (allowSplitBtHor && allowSplitTtHor && !mtt_split_cu_vertical_flag)) | |
|     mtt_split_cu_binary_flag | ae(v) |
|   if( MttSplitMode[ x0 ][ y0 ][ mttDepth ] == SPLIT_BT_VER ) { | |
|     doft += (x0+cbWidth > wTile[TileId]) ? 1:0 | |
|     x1 = x0 + ( cbWidth / 2 ) | |
|     multi_type_tree(x0,y0,cbWidth/2,cbHeight,mttDepth+1,doft, 0,treeType) | |
|     if( x1 < wTile[TileId ] ) | |
|       multi_type_tree(x1,y0,cbWidth/2,cbHeightY,mttDepth+1,doft ,1,treeType) | |
|   } else if( MttSplitMode[ x0 ][ y0 ][ mttDepth ] == SPLIT_BT_HOR ) { | |
|     doft += (y0+cbHeight > hTile[TileId])?1:0 | |
|     y1 = y0 + ( cbHeight / 2 ) | |
|     multi_type_tree(x0,y0,cbWidth,cbHeight/2,mttDepth+1,doft, 0,treeType) | |
|     if( y1 < hTile[TileId ] ) | |
|       multi_type_tree(x0,y1,cbWidth,cbHeight/2,mttDepth+1,doft, 1,treeType) | |
|   } else if( MttSplitMode[ x0 ][ y0 ][ mttDepth ] == SPLIT_TT_VER ) { | |
|     x1 = x0 + ( cbWidth / 4 ) | |
|     x2 = x0 + ( 3 * cbWidth / 4 ) | |
|     multi_type_tree(x0,y0,cbWidth/4,cbHeight,mttDepth+1,doft, 0,treeType) | |
|     multi_type_tree(x1,y0,cbWidth/2,cbHeight,mttDepth+1,doft, 1,treeType) | |
|     multi_type_tree(x2,y0,cbWidth/4,cbHeight,mttDepth+1,doft, 2,treeType) | |
|   } else { /* SPLIT_TT_HOR */ | |
|     y1 = y0 + ( cbHeight / 4 ) | |
|     y2 = y0 + ( 3 * cbHeight / 4 ) | |
|     multi_type_tree(x0,y0,cbWidth,cbHeight/4,mttDepth+1,doft,0,treeType) | |
|     multi_type_tree(x0,y1,cbWidth,cbHeight/2,mttDepth+1,doft,1,treeType) | |
|     multi_type_tree(x0,y2,cbWidth,cbHeight/4,mttDepth+1,doft,2,treeType) | |
|   } | |
| } else | |
|   coding_unit( x0, y0, cbWidth, cbHeight, treeType ) | |
| } | |

FIG. 11

(a)
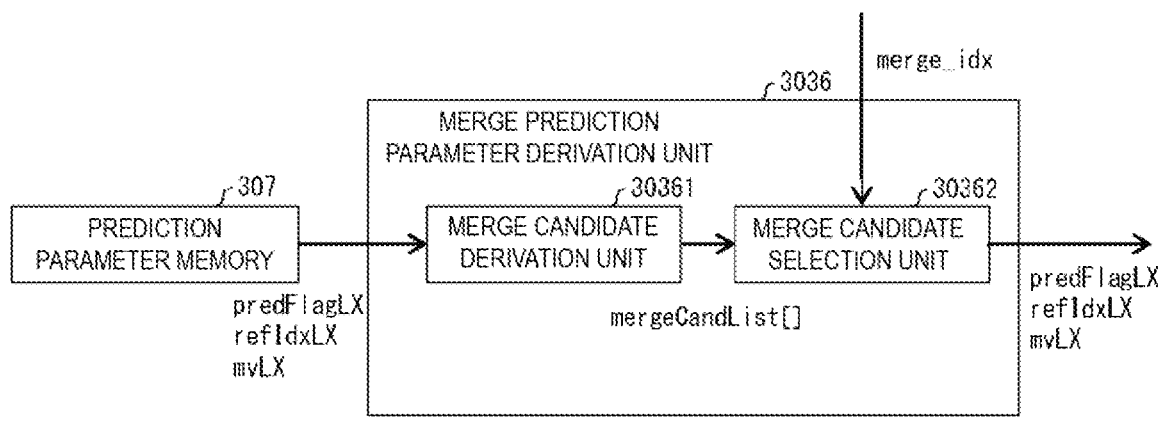
(b)
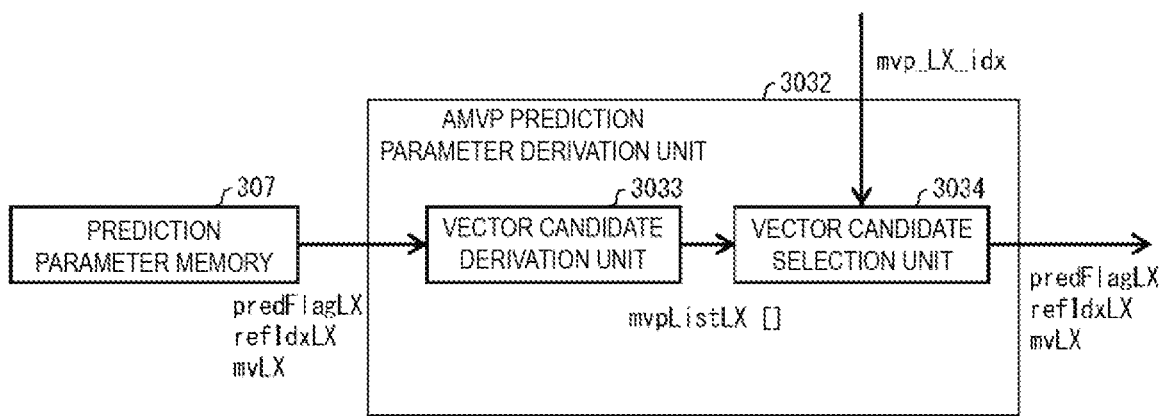
FIG. 13

SPLIT_QT

PROHIBIT 2 × 2

| CHROMA PREDICTION MODE | MULTIPLICATION | PARAMETER DERIVATION | REFERENCE PIXEL |
|---|---|---|---|
| DC | NOT REQUIRED | REQUIRED (EASY) | LEFT, TOP |
| Planar | REQUIRED | REQUIRED | LEFT, TOP, TOP LEFT, TOP RIGHT, BOTTOM LEFT |
| Angular (H, V) | NOT REQUIRED | NOT REQUIRED | LEFT, TOP |
| Angular (DIA, 45 DEGREES) | NOT REQUIRED | NOT REQUIRED | LEFT, TOP, TOP LEFT |
| Angular (VDIA, 13 DEGREES) | NOT REQUIRED | NOT REQUIRED | TOP, TOP RIGHT |
| Angular (OTHER THAN ABOVE) | REQUIRED | REQUIRED | LEFT, TOP, TOP LEFT, TOP RIGHT, BOTTOM LEFT |
| CCLM (INTRA_LT_CCLM, INTRA_L_CCLM, INTRA_T_CCLM) | REQUIRED | REQUIRED (COMPLICATED) | LEFT, TOP |

| BLOCK SIZE | CHROMA PREDICTION MODE |
|---|---|
| ALL | DC, DIRECTIONAL PREDICTION, CCLM |

(b)

| BLOCK SIZE | CHROMA PREDICTION MODE |
|---|---|
| 2x2 | {DC,} RESTRICTED Angular PREDICTION (H, V) |
| OTHER THAN ABOVE | DC, Planar, Angular PREDICTION (2-66 etc), CCLM (81, 82, 83 etc) |

| BLOCK SIZE | CHROMA PREDICTION MODE |
|---|---|
| 2x2, 4x2, 2x4 | {DC,} RESTRICTED Angular PREDICTION (H, V) |
| OTHER THAN ABOVE | DC, Planar, Angular PREDICTION (2-66 etc), CCLM (81, 82, 83 etc) |

FIG. 21

(CCLM OFF)

(a)

| intra_chroma_pred_mode | Bin string |
|---|---|
| 4 | 0 |
| 0 | 100 |
| 1 | 101 |
| 2 | 110 |
| 3 | 111 |

(b)

| intra_chroma_pred_mode[ xCb ][ yCb ] | IntraPredModeY[ xCb + cbWidth / 2 ][ yCb + cbHeight / 2 ] | | | | |
|---|---|---|---|---|---|
| | 0 (Planar) | 50 (V) | 18 (H) | 1 (DC) | X (0<=X<=66) |
| 0 | 66 (VDIA) | 0 (Planar) | 0 (Planar) | 0 (Planar) | 0 (Planar) |
| 1 | 50 (V) | 66 (VDIA) | 50 (V) | 50 (V) | 50 (V) |
| 2 | 18 (H) | 18 (H) | 66 (VDIA) | 18 (H) | 18 (H) |
| 3 | 1 (DC) | 1 (DC) | 1 (DC) | 66 (VDIA) | 1 (DC) |
| 4 | 0 (Planar) | 50 (V) | 18 (H) | 1 (DC) | X |

FIG. 22

(CCLM ON)

(a)

| intra_chroma_pred_mode | Bin string |
|---|---|
| 7 | 0 |
| 4 | 10 |
| 5 | 1110 |
| 6 | 1111 |
| 0 | 11000 |
| 1 | 11001 |
| 2 | 11010 |
| 3 | 11011 |

(b)

| intra_chroma_pred_mode[ xCb ][ yCb ] | IntraPredModeY[ xCb + cbWidth / 2 ][ yCb + cbHeight / 2 ] | | | | |
|---|---|---|---|---|---|
| | 0 (Planar) | 50 (V) | 18 (H) | 1 (DC) | X (0<=X<=66) |
| 0 | 66 (VDIA) | 0 (Planar) | 0 (Planar) | 0 (Planar) | 0 (Planar) |
| 1 | 50 (V) | 66 (VDIA) | 50 (V) | 50 (V) | 50 (V) |
| 2 | 18 (H) | 18 (H) | 66 (VDIA) | 18 (H) | 18 (H) |
| 3 | 1 (DC) | 1 (DC) | 1 (DC) | 66 (VDIA) | 1 (DC) |
| 4 | 81 (CCLM) | 81 (CCLM) | 81 (CCLM) | 81 (CCLM) | 81 (CCLM) |
| 5 | 82 (CCLM_L) | 82 (CCLM_L) | 82 (CCLM_L) | 82 (CCLM_L) | 82 (CCLM_L) |
| 6 | 83 (CCLM_A) | 83 (CCLM_A) | 83 (CCLM_A) | 83 (CCLM_A) | 83 (CCLM_A) |
| 7 | 0 (Planar) | 50 (V) | 18 (H) | 1 (DC) | X |

| BLOCK SIZE | intra_chroma_pred_mode | CHROMA PREDICTION MODE |
|---|---|---|
| LESS THAN PRESCRIBED SIZE | binarization OF 1 BIT | RESTRICTED Angular PREDICTION (H, V) |
| OTHER THAN ABOVE | binarization OF 1 TO N BITS | DC, Planar, Angular PREDICTION (2-66 etc), CCLM (81, 82, 83 etc) |

(b)

| BLOCK SIZE | intra_chroma_pred_mode | CHROMA PREDICTION MODE |
|---|---|---|
| LESS THAN PRESCRIBED SIZE | binarization OF 1 BIT | DC, RESTRICTED Angular PREDICTION (H, V) |
| OTHER THAN ABOVE | binarization OF 1 TO N BITS | DC, Planar, Angular PREDICTION (2-66 etc), CCLM (81, 82, 83 etc) |

| intra_chroma_pred_mode | Bin string |
|---|---|
| 0 | 0 |
| 1 | 1 |

(b)

| intra_chroma_pred_mode[ xCb ][ yCb ] | IntraPredModeY[ xCb + cbWidth / 2 ][ yCb + cbHeight / 2 ] | | | | |
|---|---|---|---|---|---|
| | 0 (Planar) | 50 (V) | 18 (H) | 1 (DC) | X (0<=X<=66) |
| 0 | 50 (V) | 50 (V) | 50 (V) | 50 (V) | 50 (V) |
| 1 | 18 (H) | 18 (H) | 18 (H) | 18 (H) | 18 (H) |

| BLOCK SIZE | intra_chroma_pred_mode | CHROMA PREDICTION MODE |
|---|---|---|
| LESS THAN PRESCRIBED SIZE | NOT DECODE | RESTRICTED Angular PREDICTION (H, V) |
| OTHER THAN ABOVE | binarization OF 1 TO N BITS | DC, Planar, Angular PREDICTION (2-66 etc), CCLM (81, 82, 83 etc) |

(b)

| BLOCK SIZE | intra_chroma_pred_mode | CHROMA PREDICTION MODE |
|---|---|---|
| LESS THAN PRESCRIBED SIZE | NOT DECODE | DC, RESTRICTED Angular PREDICTION (H, V) |
| OTHER THAN ABOVE | binarization OF 1 TO N BITS | DC, Planar, Angular PREDICTION (2-66 etc), CCLM (81, 82, 83 etc) |

| intra_chroma_pred_mode | Bin string |
|---|---|
| 0 | - |

(b)

| intra_chroma_pred_mode[ xCb ][ yCb ] | IntraPredModeY[ xCb + cbWidth / 2 ][ yCb + cbHeight / 2 ] | | | | |
|---|---|---|---|---|---|
| | 0 (Planar) | 50 (V) | 18 (H) | 1 (DC) | X (0<=X<=66) |
| 0 | 1 (DC) | 50 (V) | 18 (H) | 1 (DC) | 50 (X>=DIA) |
| | | | | | 18 (X<DIA) |

| intra_chroma_pred_mode | Bin string |
|---|---|
| 0 | - |

(b)

| intra_chroma_pred_mode[ xCb ][ yCb ] | IntraPredModeY[ xCb + cbWidth / 2 ][ yCb + cbHeight / 2 ] | | | | |
|---|---|---|---|---|---|
| | 0 (Planar) | 50 (V) | 18 (H) | 1 (DC) | X (0<=X<=66) |
| 0 | DC | DC | DC | DC | DC |

FIG. 31

VIDEO DECODING APPARATUS AND VIDEO DECODING METHOD

CROSS-REFERENCE OF RELATED APPLICATION

The present application is a continuation application of U.S. patent application Ser. No. 17/311,302, filed on Jun. 4, 2021, which claims priority from Japanese Application 2018-229864 filed on Dec. 7, 2018, the content of which is hereby incorporated by reference into this application.

TECHNICAL FIELD

Embodiments of the present invention relate to a video decoding apparatus and a video coding apparatus.

BACKGROUND ART

A video coding apparatus which generates coded data by coding a video, and a video decoding apparatus which generates decoded images by decoding the coded data are used for efficient transmission or recording of videos.

For example, specific video coding schemes include schemes proposed in H.264/AVC and High-Efficiency Video Coding (HEVC), and the like.

In such a video coding scheme, images (pictures) constituting a video are managed in a hierarchical structure including slices obtained by splitting an image, coding tree units (CTUs) obtained by splitting a slice, units of coding (which will be referred to as coding units (CUs)) obtained by splitting a coding tree unit, and transform units (TUs) which are obtained by splitting a coding unit, and are coded/decoded for each CU.

In such a video coding scheme, usually, a prediction image is generated based on a local decoded image that is obtained by coding/decoding an input image (an original image), and prediction errors (which may be referred to also as "difference images" or "residual images") obtained by subtracting the prediction image from the input image are coded. Generation methods of prediction images include an inter-picture prediction (an inter prediction) and an intra-picture prediction (intra prediction).

Further, as a technique of video coding and decoding of recent years, NPL 1 is given.

Further, NPL 1 discloses a technique in which a picture is split into rectangle CTU blocks, and then the CTUs are further recursively split with a multiple tree, such as a quad tree, a binary tree, and a ternary tree, which is referred to as a multi tree MTT (QTBT, QTBTTT).

CITATION LIST

Non Patent Literature

NPL 1: "Versatile Video Coding (Draft 3)", JVET-L1001, Joint Video Exploration Team (JVET) of ITU-T SG 16 WP 3 and ISO/IEC JTC 1/SC 29/WG 11, 2018 Nov. 8 17:06:06

SUMMARY OF INVENTION

Technical Problem

In the technique of NPL 1, various split methods including the quad tree, the binary tree, and the ternary tree are implemented. However, a small block of 2×2 needs to be coded or decoded as an intra chroma block. A small block has large overhead per pixel, and hence has a problem of deteriorating entire throughput, due to increase in processing delay in intra prediction in particular. In particular, in a method using a DUAL tree, processing of a chroma image of a chroma tree needs to be performed after a luma image of a luma tree. Thus, there is a problem in that the luma image and the chroma image cannot be processed in parallel with each other as is the case with a common tree. Further, prediction of an intra image using multiplication and an intra prediction using reference to an oblique direction have large processing delay in particular.

Solution to Problem

An aspect of the present invention includes, in a video decoding apparatus using a case that two different trees (DUAL tree) are used between luma and chroma and a case that a common tree (SINGLE tree) is used for luma and chroma, a CT information decoder configured to decode qt_split_cu_flag indicating whether a QT split is to be performed, mtt_split_cu_flag indicating presence or absence of an MT split, mtt_split_cu_vertical_flag indicating a split direction of the MT split, and mtt_split_cu_binary_flag indicating a split type of the MT split. In the DUAL tree of chroma, the CT information decoder derives 0 without decoding qt_split_cu_flag in a case of an 8×8 block in a luma size, derives 0 without decoding mtt_split_cu_flag in a case of an 8×4/4×8 block in a luma size, and derives 0 without decoding mtt_split_cu_binary_flag in a case of a 16×4/4×16 block in a luma size.

In an aspect of the present invention, the CT information decoder derives a minimum QT split size of chroma as 8 or more.

In an aspect of the present invention, in derivation of a BT split allow flag, in a case that the sum of width of chroma and height of chroma is 6 or less, the CT information decoder derives false indicating that the split is not allowed.

In an aspect of the present invention, in derivation of a TT split allow flag, in a case that the sum of width of chroma and height of chroma is 10 or less, the CT information decoder derives false indicating that the split is not allowed.

In an aspect of the present invention, in the description above, in a case of an 8×4/4×8/8×2/2×8/4×4 block in a luma size, 0 is derived without decoding mtt_split_cu_flag, and in a case of a 16×4/4×16/16×8/8×16/32×4/4×32 block in a luma size, 0 is derived without decoding mtt_split_cu_binary_flag.

In an aspect of the present invention, in derivation of a BT split allow flag, in a case that the sum of width of chroma and height of chroma is 12 or less, the CT information decoder derives false indicating that the split is not allowed.

In an aspect of the present invention, in derivation of a TT split allow flag, in a case that the sum of width of chroma and height of chroma is 20 or less, the CT information decoder derives false indicating that the split is not allowed.

In an aspect of the present invention, in a video coding apparatus or a video decoding apparatus including a parameter decoder configured to decode a chroma intra prediction mode intra_chroma_pred_mode, an intra parameter derivation unit configured to derive a chroma intra mode according to the chroma intra prediction mode, and an intra prediction image generation unit configured to perform DC prediction and planar prediction, directional prediction, and luma chroma prediction according to the chroma intra mode, in a case that a size of a target block is less than a prescribed size, the parameter decoder decodes a bin of 1 bit indicating a chroma intra prediction mode, or otherwise decodes a bin of 1 or more bits, and in a case that the size of the target block is less than the prescribed size, the intra parameter derivation unit derives the chroma intra mode from any one of DC, leftward prediction, and upward prediction, or otherwise derives the chroma intra mode from DC prediction and planar prediction, directional prediction, and luma chroma prediction.

In an aspect of the present invention, in a case that the size of the target block is less than the prescribed size, the intra parameter derivation unit derives the chroma intra mode by using any one of the leftward prediction and the upward prediction.

In an aspect of the present invention, in a video coding apparatus or a video decoding apparatus including a parameter decoder that decodes a chroma intra prediction mode intra_chroma_pred_mode, an intra parameter derivation unit that derives a chroma intra mode according to the chroma intra prediction mode, and an intra prediction image generation unit that performs DC prediction and planar prediction, directional prediction, and luma chroma prediction according to the chroma intra mode, in a case that a size of a target block is less than a prescribed size, the parameter decoder does not decode a bin of 1 bit indicating a chroma intra prediction mode, or otherwise decodes a bin of 1 or more bits, and in a case that the size of the target block is less than the prescribed size, the intra parameter derivation unit derives the chroma intra mode from any one of DC, leftward prediction, and upward prediction according to a luma intra prediction mode, or otherwise derives the chroma intra mode from DC prediction and planar prediction, directional prediction, and luma chroma prediction.

In an aspect of the present invention, in a case that the size of the target block is less than the prescribed size, the intra parameter derivation unit derives the chroma intra mode by using any one of the leftward prediction and the upward prediction according to the luma intra prediction mode.

In an aspect of the present invention, in a case that the size of the target block is less than the prescribed size, the intra parameter derivation unit variably derives a DC mode.

Advantageous Effects of Invention

According to an aspect of the present invention, in video coding and decoding processing of performing recursive splits such as a quad tree, a binary tree, and a ternary tree, processing delay in chroma intra prediction can be reduced.

BRIEF DESCRIPTION OF DRAWINGS

FIG. 6 is a conceptual diagram illustrating an example of reference pictures and reference picture lists.

FIG. 10 is a diagram illustrating a configuration example of a syntax table of CTU and QT information.

FIG. 11 is a diagram illustrating a configuration example of a syntax table of Multi Tree (MT) information.

FIG. 13 is a schematic diagram illustrating a configuration of a merge prediction parameter derivation unit and an AMVP prediction parameter derivation unit.

FIG. 20 is a diagram illustrating characteristics of a chroma intra prediction mode according to the present embodiment.

FIG. 21 is a diagram illustrating a relationship between a block size and the chroma intra prediction mode according to the present embodiment.

FIG. 22 is a diagram illustrating details of binalization of a chroma intra prediction mode syntax intra_chroma_pred_mode and chroma intra prediction mode derivation in a case of CCLM off according to the present embodiment.

FIG. 23 is a diagram illustrating details of binalization of the chroma intra prediction mode syntax intra_chroma_pred_mode and chroma intra prediction mode derivation in a case of CCLM on according to the present embodiment.

FIG. 24 is a diagram illustrating a relationship between the block size, the number of bits of the chroma intra prediction mode syntax intra_chroma_pred_mode, and the chroma intra prediction mode according to the present embodiment.

FIG. 26 is a diagram illustrating details of binalization of the chroma intra prediction mode syntax intra_chroma_pred_mode and chroma intra prediction mode derivation according to the present embodiment.

FIG. 27 is a diagram illustrating a relationship between the block size, the number of bits of the chroma intra prediction mode syntax intra_chroma_pred_mode, and the chroma intra prediction mode according to another aspect of the present embodiment.

FIG. 30 is a diagram illustrating details of binalization of the chroma intra prediction mode syntax intra_chroma_pred_mode and chroma intra prediction mode derivation according to another aspect of the present embodiment.

FIG. 31 is a diagram illustrating details of binalization of the chroma intra prediction mode syntax intra_chroma_pred_mode and chroma intra prediction mode derivation according to another aspect of the present embodiment.

DESCRIPTION OF EMBODIMENTS

Hereinafter, embodiments of the present invention will be described with reference to the drawings.

Figure 1:
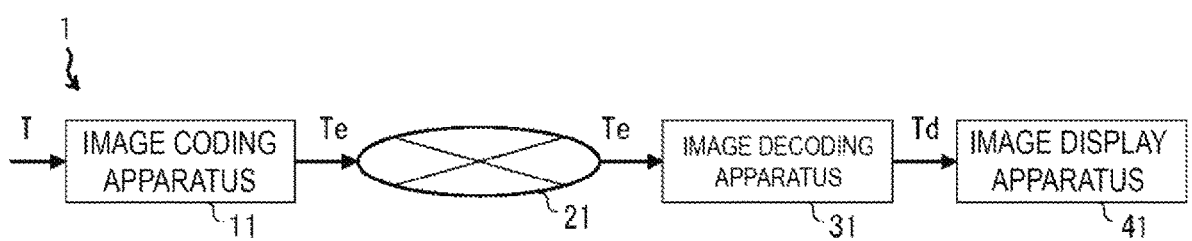
FIG. 1 is a schematic diagram illustrating a configuration of an image transmission system according to the present embodiment.

FIG. 1 is a schematic diagram illustrating a configuration of an image transmission system 1 according to the present embodiment.

The image transmission system 1 is a system in which a coding stream obtained by coding a coding target image is transmitted, the transmitted coding stream is decoded, and thus an image is displayed. The image transmission system 1 includes a video coding apparatus (image coding apparatus) 11, a network 21, a video decoding apparatus (image decoding apparatus) 31, and a video display apparatus (image display apparatus) 41.

An image T is input to the video coding apparatus 11.

The network 21 transmits a coding stream Te generated by the video coding apparatus 11 to the video decoding apparatus 31. The network 21 is the Internet, a Wide Area Network (WAN), a Local Area Network (LAN), or a combination thereof. The network 21 is not necessarily restricted to a bidirectional communication network, and may be a unidirectional communication network configured to transmit broadcast waves of digital terrestrial television broadcasting, satellite broadcasting or the like. The network 21 may be substituted by a storage medium in which the coding stream Te is recorded, such as a Digital Versatile Disc (DVD: trade name) or a Blue-ray Disc (BD: trade name).

The video decoding apparatus 31 decodes each of the coding streams Te transmitted from the network 21 and generates one or each of multiple decoded images Td.

The video display apparatus 41 displays all or part of the one or multiple decoded images Td generated by the video decoding apparatus 31. For example, the video display apparatus 41 includes a display device such as a liquid crystal display and an organic Electro-Luminescence (EL) display. Examples of the display include a stationary display, a mobile display, and an HMD. In a case that the video decoding apparatus 31 has a high processing capability, an image having high image quality is displayed, and in a case that the video decoding apparatus 31 has a lower processing capability, an image which does not require as high a processing capability and display capability is displayed.

Operator

Operators used in the present specification will be described below.

>> represents a right bit shift, << represents a left bit shift, & represents a bitwise AND, | represents a bitwise OR, |= represents an OR assignment operator, and || represents logical disjunction.

x?y:z is a ternary operator to take y in a case that x is true (other than 0) and take z in a case that x is false (0).

Clip3(a, b, c) is a function to clip c in a value equal to or greater than a and less than or equal to b, and a function to return a in a case that c is less than a (c<a), return b in a case that c is greater than b (c>b), and return c in other cases (provided that a is less than or equal to b (a<=b)).

abs(a) is a function that returns an absolute value of a.

Int(a) is a function that returns an integer value of a.

floor(a) is a function that returns a maximum integer less than or equal to a.

ceil(a) is a function that returns a maximum integer greater than or equal to a.

a/d represents division of a by d (the quotient is rounded to the nearest decimal point).

a^b represents a to the power of b.

Structure of Coding Stream Te

Prior to the detailed description of the video coding apparatus 11 and the video decoding apparatus 31 according to the present embodiment, a data structure of the coding stream Te generated by the video coding apparatus 11 and decoded by the video decoding apparatus 31 will be described.

Figure 4:
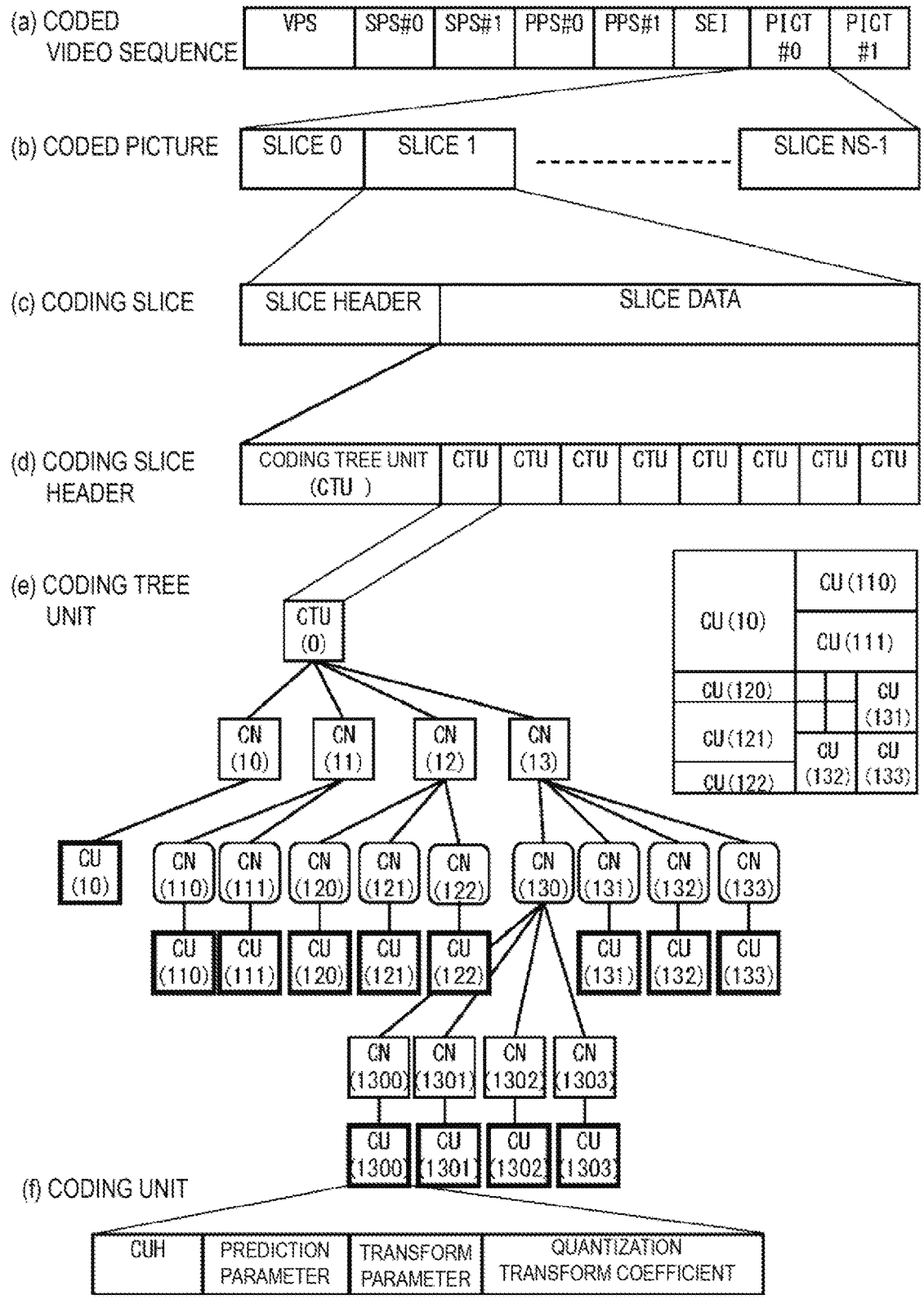
FIG. 4 is a diagram illustrating a hierarchical structure of data of a coding stream.

FIG. 4 is a diagram illustrating a hierarchical structure of data of the coding stream Te. The coding stream Te includes a sequence and multiple pictures constituting the sequence illustratively. (a) to (f) of FIG. 4 are diagrams illustrating a coded video sequence defining a sequence SEQ, a coded picture prescribing a picture PICT, a coding slice prescribing a slice S, a coding slice data prescribing slice data, a coding tree unit included in the coding slice data, and a coding unit included in each coding tree unit, respectively.

Coded Video Sequence

In the coded video sequence, a set of data referred to by the video decoding apparatus 31 to decode the sequence SEQ to be processed is defined. As illustrated in FIG. 4(*a*), the sequence SEQ includes a Video Parameter Set, a Sequence Parameter Set SPS, a Picture Parameter Set PPS, a picture PICT, and Supplemental Enhancement Information SEI.

In the video parameter set VPS, in a video including multiple layers, a set of coding parameters common to multiple videos and a set of coding parameters associated with the multiple layers and an individual layer included in the video are defined.

In the sequence parameter set SPS, a set of coding parameters referred to by the video decoding apparatus 31 to decode a target sequence is defined. For example, a width and a height of a picture are defined. Note that multiple SPSs may exist. In that case, any of multiple SPSs is selected from the PPS.

In the picture parameter set PPS, a set of coding parameters referred to by the video decoding apparatus 31 to decode each picture in a target sequence is defined. For example, a reference value (pic_init_qp_minus26) of a quantization step size used for decoding of a picture and a flag (weighted_pred_flag) indicating an application of a weighted prediction are included. Note that multiple PPSs may exist. In that case, any of multiple PPSs is selected from each picture in a target sequence.

Coded Picture

In the coded picture, set of pieces of data referred to by the video decoding apparatus 31 to decode the picture PICT to be processed is defined. As illustrated in FIG. 4(*b*), the picture PICT includes a slice 0 to a slice NS−1 (NS is a total number of slices included in the picture PICT).

Note that in a case that it is not necessary to distinguish each of the slice 0 to the slice NS−1, subscripts of reference signs may be omitted. The same holds true for other pieces of data denoted by subscripts, even regarding pieces of data included in the coding stream Te to be described below.

A color format of a picture may be a color format of Y, Cb, and Cr, a color format of R, G, and B, or another color format. Further, sampling for each color component may be different from one another. For example, as ratios of sampling numbers of the first color component, the second color component, and the third color component, the following shows a horizontal ratio SubWidthC and a vertical ratio SubHeightC of the first and second colors. For example, the following shows cases for 4:4:4, 4:2:2, and 4:2:0.

4:2:0, SubWidthC=2, SubHeightC=2
4:2:2, SubWidthC=2, SubHeightC=1
4:4:4, SubWidthC=1, SubHeightC=1

The video coding apparatus 11 and the video decoding apparatus 31 may code and decode chroma_format_idc.

chroma_format_idc=0, 4:0:0 (monochrome)
chroma_format_idc=1, 4:2:0
chroma_format_idc=2, 4:2:2
chroma_format_idc=3, 4:4:4

Coding Slice

In the coding slice, a set of data referred to by the video decoding apparatus 31 to decode the slice S to be processed is defined. As illustrated in FIG. 4(c), the slice includes slice header and slice data.

The slice header includes a coding parameter group referred to by the video decoding apparatus 31 to determine a decoding method for a target slice. Slice type specification information (slice_type) indicating a slice type is one example of a coding parameter included in the slice header.

Examples of slice types that can be specified by the slice type specification information include (1) I slice using only an intra prediction in coding, (2) P slice using a unidirectional prediction or an intra prediction in coding, and (3) B slice using a unidirectional prediction, a bidirectional prediction, or an intra prediction in coding, and the like. Note that inter prediction is not restricted to uni-prediction and bi-prediction, and the prediction image may be generated by using a larger number of reference pictures. The term "P slice" or "B slice" hereinafter refers to a slice including a block that can be subjected to the inter prediction.

Note that, the slice header may include a reference (pic_parameter_set_id) to the picture parameter set PPS.

Coding Slice Data

In the coding slice data, a set of data referred to by the video decoding apparatus 31 to decode the slice data to be processed is defined. As illustrated in FIG. 4(d), the slice data includes CTUs. A CTU is a block of a fixed size (for example, 64×64) constituting a slice, and may be called a Largest Coding Unit (LCU).

Coding Tree Unit

In FIG. 4(e), a set of data referred to by the video decoding apparatus 31 to decode the CTU to be processed is defined. The CTU is split into coding units CU, each of which is a basic unit of coding processing, by recursive Quad Tree split (QT split), Binary Tree split (BT split), or Ternary Tree split (TT split). The BT split and the TT split are collectively referred to as a Multi Tree split (MT split). Nodes of a tree structure obtained by recursive quad tree splits are referred to as Coding Nodes. Intermediate nodes of a quad tree, a binary tree, and a ternary tree are coding nodes, and the CTU itself is also defined as a highest coding node.

The CT includes, as CT information, a QT split flag (qt_split_cu_flag) indicating whether the QT split is to be performed, an MT split flag (mtt_split_cu_flag) indicating presence or absence of the MT split, an MT split direction (mtt_split_cu_vertical_flag) indicating a split direction of the MT split, and mtt_split_cu_binary_flag) indicating a split type of the MT split. qt_split_cu_flag, mtt_split_cu_flag, mtt_split_cu_vertical_flag, and mtt_split_cu_binary_flag are transmitted for each coding node.

Figure 5:
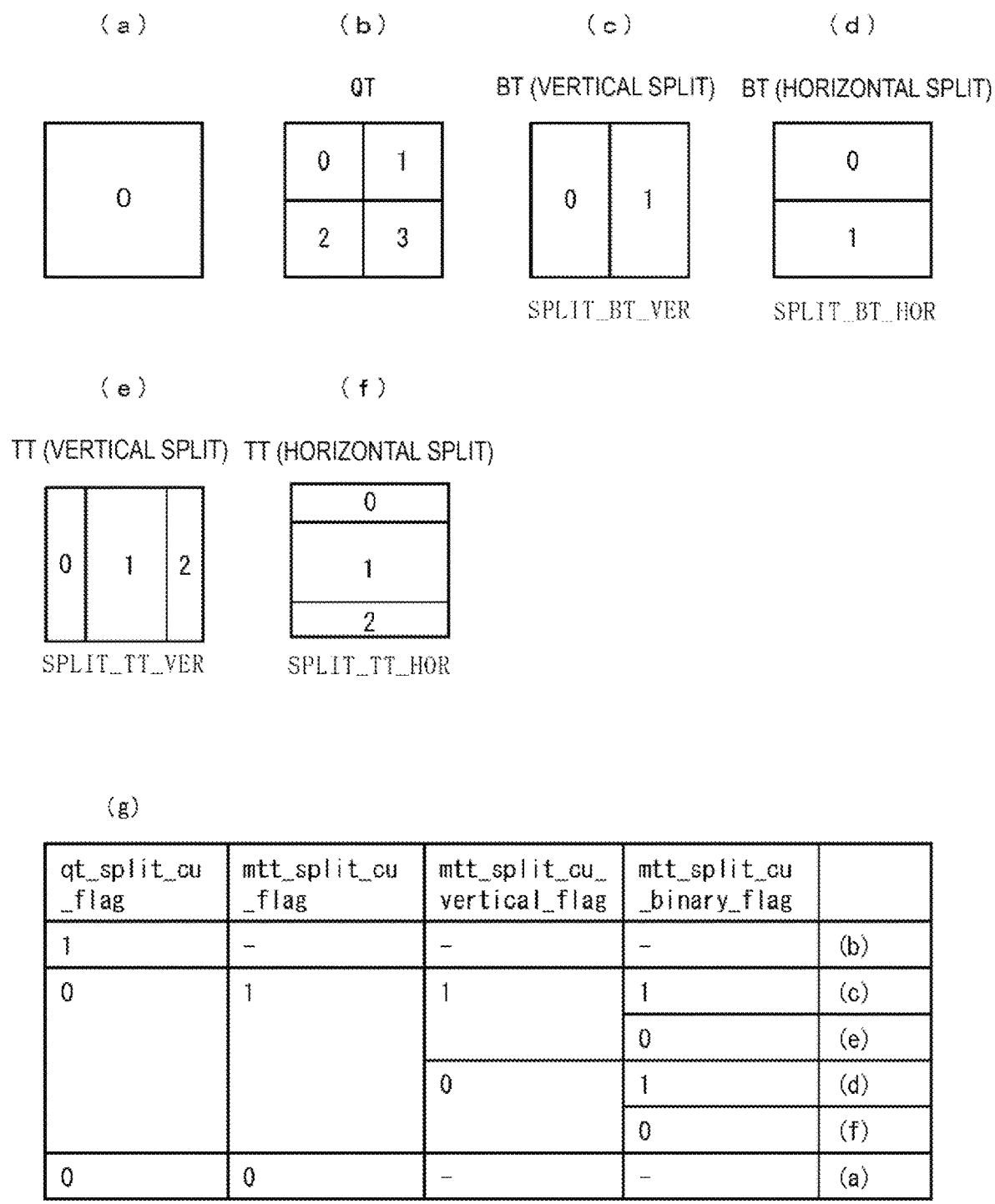
FIG. 5 is a diagram illustrating split examples of a CTU.

In a case that qt_split_cu_flag is 1, the coding node is split into four coding nodes (FIG. 5(b)).

In a case that qt_split_cu_flag is 0, the coding node is not split and one CU is present as a node in a case that mtt_split_cu_flag is 0 (FIG. 5(a)). The CU is a terminal node of the coding node, and is not split any further. The CU is a basic unit of coding processing.

In a case that mtt_split_cu_flag is 1, the coding node is subjected to the MT split as follows. In a case of mtt_split_cu_binary_flag being 1, the coding node is horizontally split (SPLIT_BT_HOR) into two coding nodes in a case that mtt_split_cu_vertical_flag is 0 (FIG. 5(d)), and the coding node is vertically split (SPLIT_BT_VER) into two coding nodes in a case that mtt_split_cu_vertical_flag is 1 (FIG. 5(c)). In a case of mtt_split_cu_binary_flag being 0, the coding node is horizontally split (SPLIT_TT_HOR) into three coding nodes in a case that mtt_split_cu_vertical_flag is 0 (FIG. 5(f)), and the coding node is vertically split (SPLIT_TT_VER) into three coding nodes in a case that mtt_split_cu_vertical_flag is 1 (FIG. 5(e)). These are illustrated in FIG. 5(g).

In a case that the size of the CTU is 64×64 pixels, the size of the CU may be any one of 64×64 pixels, 64×32 pixels, 32×64 pixels, 32×32 pixels, 64×16 pixels, 16×64 pixels, 32×16 pixels, 16×32 pixels, 16×16 pixels, 64×8 pixels, 8×64 pixels, 32×8 pixels, 8×32 pixels, 16×8 pixels, 8×16 pixels, 8×8 pixels, 64×4 pixels, 4×64 pixels, 32×4 pixels, 4×32 pixels, 16×4 pixels, 4×16 pixels, 8×4 pixels, 4×8 pixels, and 4×4 pixels.

Different trees may be used between luma (first color component, cIdx=0) and chroma (second, third color component cIdx=1, 2). The type of the tree is represented by treeType. For example, in a case that a common tree is used for luma and chroma, a common single tree is represented by treeType=SINGLE_TREE. In a case that two different trees (DUAL tree) are used between luma (Y, cIdx=0) and chroma (Cb/Cr, cIdx=1, 2), the tree of luma is represented by treeType=DUAL_TREE_LUMA, and the tree of chroma is represented by treeType=DUAL_TREE_CHROMA. In a case of DUAL_TREE_CHROMA, only a chroma image is coded and decoded, and is hence also simply referred to as a chroma tree.

Coding Unit

As illustrated in FIG. 4(f), a set of data referred to by the video decoding apparatus 31 to decode the coding unit to be processed is defined. Specifically, the CU includes a CU header CUH, a prediction parameter, a transform parameter, a quantization transform coefficient, and the like. In the CU header, a prediction mode and the like are defined.

Prediction processing may be performed in each CU, or may be performed in each sub-CU, which is a unit obtained by further splitting the CU. In a case that the size of the CU and the size of the sub-CU are the same, there is only one sub-CU in a CU. In a case that the size of the CU is larger than the size of the sub-CU, the CU is split into sub-CUs. For example, in a case that the CU has a size of 8×8 and the sub-CU has a size of 4×4, the CU is split into four sub-CUs, which are obtained by two horizontal splits and two vertical splits.

The prediction has two types (prediction modes), that is, an intra prediction and an inter prediction. The intra prediction refers to a prediction in an identical picture, and the inter prediction refers to prediction processing performed between different pictures (for example, between pictures of different display times, and between pictures of different layer images).

Although the transform and quantization processing is performed in each CU, the quantization transform coefficient may be subjected to entropy coding in each subblock having a size of 4×4 or the like.

Prediction Parameter

The prediction image is derived by using the prediction parameter that is associated with the block. The prediction parameter includes prediction parameters for the intra prediction and the inter prediction.

The prediction parameters of the inter prediction will be described below. The inter prediction parameters include prediction list utilization flags predFlagL0 and predFlagL1, reference picture indexes refIdxL0 and refIdxL1, and motion vectors mvL0 and mvL1. The prediction list utilization flags predFlagL0 and predFlagL1 are flags indicating whether the reference picture lists respectively referred to as an L0 list and an L1 list are to be used, and a reference picture list corresponding to a case that the value is 1 is used. Note that, in a case that the present specification mentions "a flag indicating whether XX", a flag being other than 0 (for example, 1) assumes a case of XX, and a flag being 0 assumes a case of not XX, and 1 is treated as true and 0 is treated as false in a logical negation, a logical product, and the like (the same applies hereinafter). However, other values can be used for true values and false values in real apparatuses and methods.

The prediction parameters of the intra prediction will be described below. The intra prediction parameters include a luma prediction mode IntraPredModeY and a chroma prediction mode IntraPredModeC. FIG. AA7 is a schematic diagram illustrating types (mode numbers) of an intra prediction mode. As illustrated in FIG. AA7, the intra prediction mode includes, for example, 67 types (0 to 66). For example, there are planar prediction (0), DC prediction (1), and Angular prediction (2 to 66). In addition, in chroma, a CCLM mode (81 to 83, Colour Component Linear Model) for performing luma chroma prediction may be added.

The syntax element for deriving the intra prediction parameters include, for example, intra_luma_mpm_flag, mpm_idx, mpm_remainder, and the like.

MPM intra_luma_mpm_flag is a flag indicating whether the whether the luma prediction mode IntraPredModeY of the target block and the Most Probable Mode (MPM) match each other. The MPM is a prediction mode included in an MPM candidate list mpmCandList[ ]. The MPM candidate list is a list that stores candidates that are inferred to have high probability of being applied to the target block, based on the intra prediction mode of a neighboring block and a prescribed intra prediction mode. In a case that intra_luma_mpm_flag is 1, the luma prediction mode IntraPredModeY of the target block is derived by using the MPM candidate list and the index mpm_idx.

$$IntraPredModeY=mpmCandList[mpm\_idx]$$

REM

In a case that intra_luma_mpm_flag is 0, the luma prediction mode IntraPredModeY is derived by using mpm_remainder. Specifically, IntraPredModeY is selected from mode RemIntraPredMode, which remains after removing the intra prediction mode included in the MPM candidate list from the whole intra prediction mode.

Configuration of Video Decoding Apparatus

Figure 7:
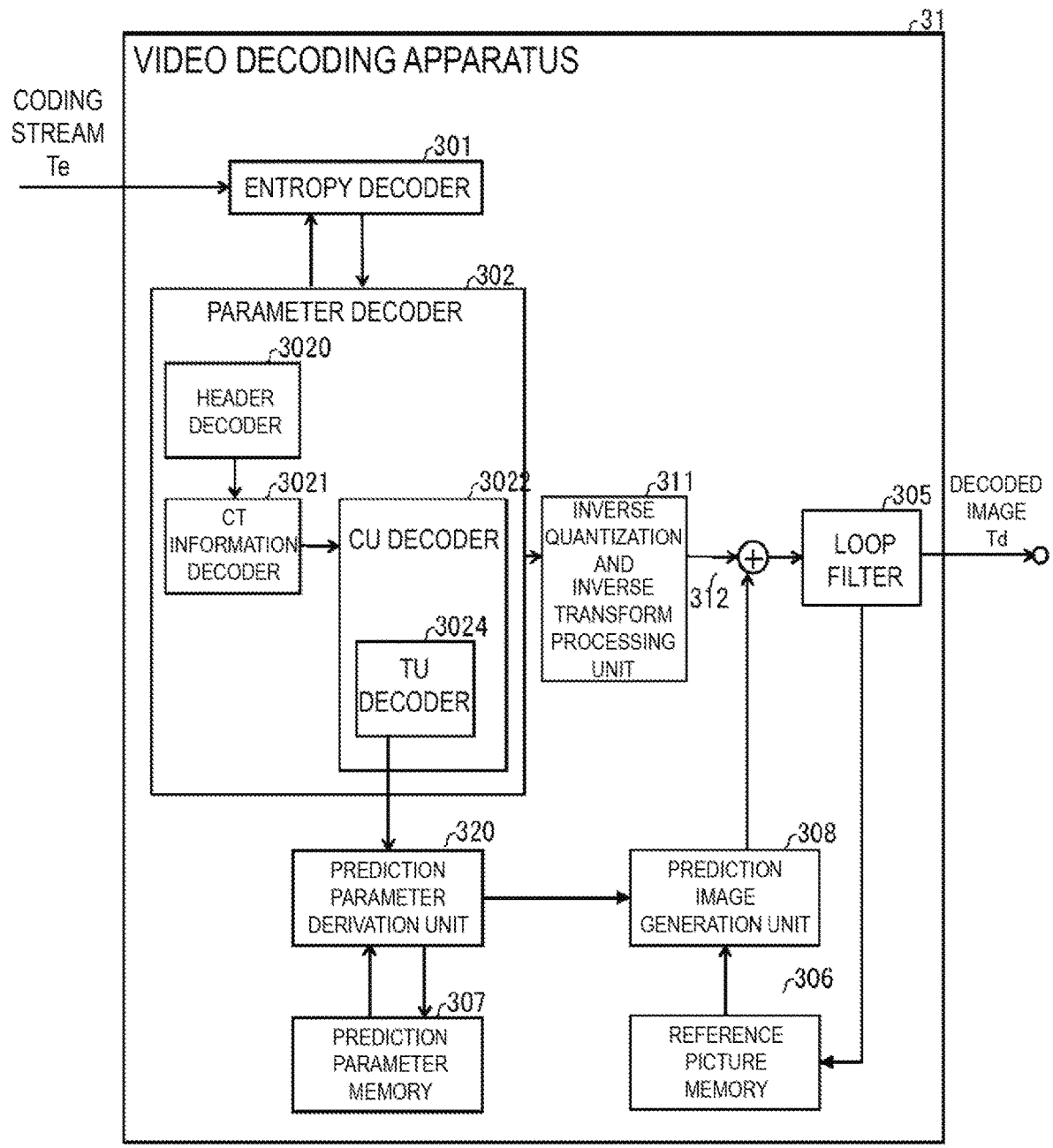
FIG. 7 is a schematic diagram illustrating a configuration of the video decoding apparatus.

Next, a configuration of the video decoding apparatus 31 (FIG. 7) according to the present embodiment will be described.

The video decoding apparatus 31 includes an entropy decoder 301, a parameter decoder (a prediction image decoding apparatus) 302, a loop filter 305, a reference picture memory 306, a prediction parameter memory 307, a prediction image generation unit (prediction image generation apparatus) 308, an inverse quantization and inverse transform processing unit 311, and an addition unit 312. Note that, in accordance with the video coding apparatus 11 to be described later, a configuration that the video decoding apparatus 31 does not include the loop filter 305 may be employed.

The parameter decoder 302 further includes a header decoder 3020, a CT information decoder 3021, and a CU decoder 3022 (prediction mode decoder), and the CU decoder 3022 further includes a TU decoder 3024. These components may be collectively referred to as a decoding module. The header decoder 3020 decodes parameter set information such as the VPS, the SPS, and the PPS, and the slice header (slice information) from the coded data. The CT information decoder 3021 decodes the CT from the coded data. The CU decoder 3022 decodes the CU from the coded data. In a case that the TU includes a prediction error, the TU decoder 3024 decodes QP update information (quantization correction value) and a quantization prediction error (residual_coding) from the coded data.

The parameter decoder 302 includes an inter prediction parameter derivation unit 303 and an intra prediction parameter derivation unit 304 (not illustrated). The prediction image generation unit 308 includes an inter prediction image generation unit 309 and an intra prediction image generation unit 310.

The following description illustrates an example in which processing is performed in each CTU or CU. However, this example is not restrictive, and processing may be performed in each sub-CU. Alternatively, the CTU and the CU may be interpreted as a block and the sub-CU as a subblock, such that processing may be performed in each block or subblock.

The entropy decoder 301 performs entropy decoding on the coding stream Te input from the outside and decodes individual codes (syntax elements). The entropy coding includes a scheme in which syntax elements are subjected to variable length coding by using a context (probability model) that is adaptively selected according to a type of the syntax elements and a surrounding condition, and a scheme in which syntax elements are subjected to variable length coding by using a table or a calculation expression that is determined in advance. In the former Context Adaptive Binary Arithmetic Coding (CABAC), probability models updated for each coded or decoded picture (slice) are stored in memory. Then, as the initial state of the context of a P picture or a B picture, the probability model of a picture using the same slice type and the same slice level quantization parameter is configured out of the probability models stored in the memory. The initial state is used for coding and decoding processing. The decoded codes include prediction information for generating a prediction image, prediction errors for generating a difference image, and the like.

The entropy decoder 301 outputs the decoded codes to the parameter decoder 302. The decoded codes include, for example, a prediction mode predMode, a merge flag merge_flag, a merge index merge_idx, an inter prediction indicator inter_pred_idc, a reference picture index refIdxLX, a prediction vector index mvp_LX_idx (mvp_lx_ flag), difference vectors mvdLX and amvr_mode, and the like. Which code is to be decoded is controlled based on an indication of the parameter decoder 302.

Basic Flow of Operation

Figure 8:
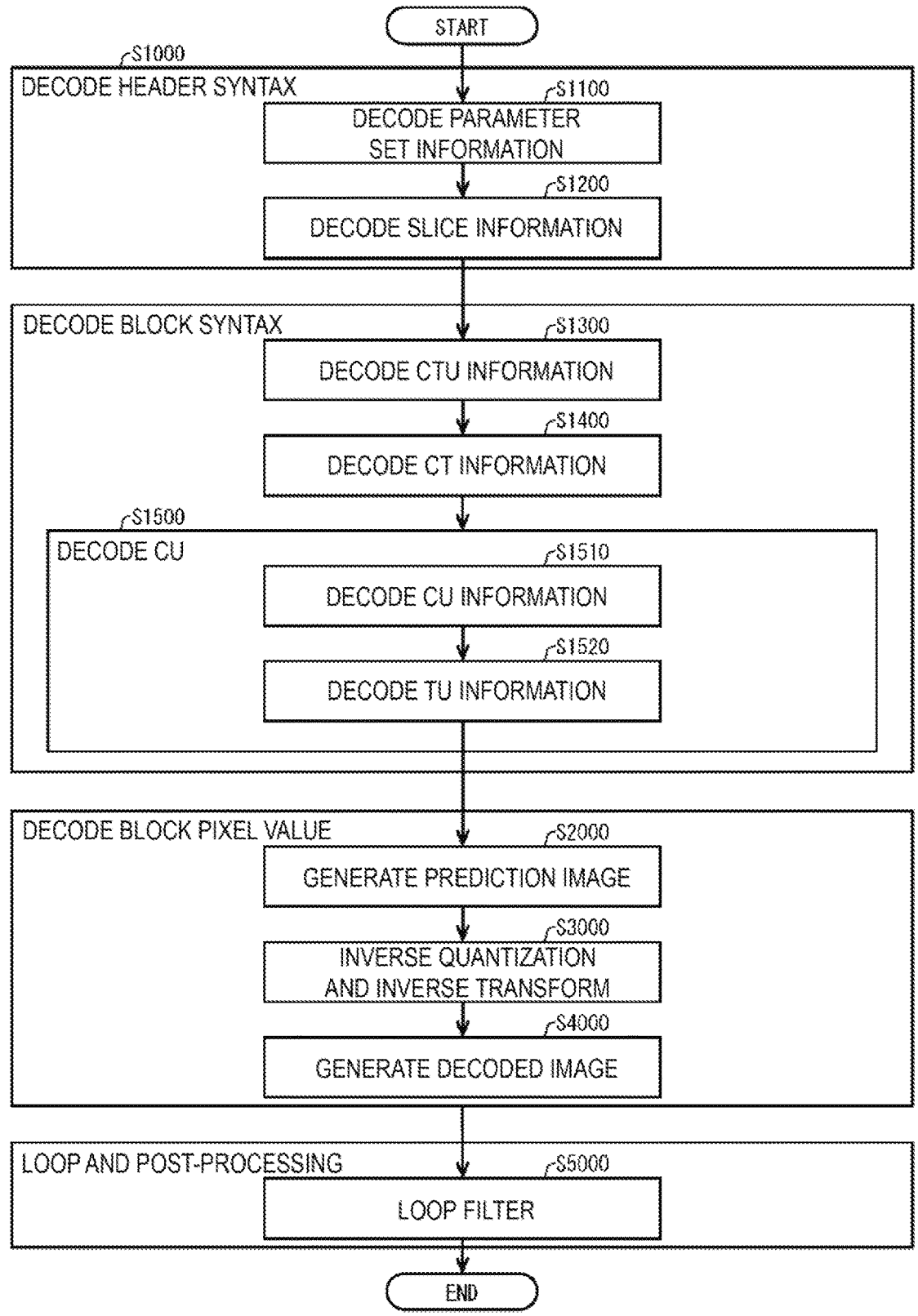
FIG. 8 is a flowchart illustrating general operation of the video decoding apparatus.

FIG. 8 is a flowchart for describing general operation performed in the video decoding apparatus 31.

(S1100: Decoding of parameter set information) The header decoder 3020 decodes parameter set information such as the VPS, the SPS, and the PPS from coded data.

(S1200: Decoding of slice information) The header decoder 3020 decodes a slice header (slice information) from the coded data.

Afterwards, the video decoding apparatus 31 repeats the processing from S1300 to S5000 for each CTU included in the target picture, and thereby derives a decoded image of each CTU.

(S1300: Decoding of CTU information) The CT information decoder 3021 decodes the CTU from the coded data.

(S1400: Decoding of CT information) The CT information decoder 3021 decodes the CT from the coded data.

(S1500: Decoding of CU) The CU decoder 3022 decodes the CU from the coded data by performing S1510 and S1520.

(S1510: Decoding of CU information) The CU decoder 3022 decodes, for example, CU information, prediction information, a TU split flag split_transform_flag, CU residual flags cbf_cb, cbf_cr, and cbf_luma from the coded data.

(S1520: Decoding of TU information) In a case that a prediction error is included in the TU, the TU decoder 3024 decodes QP update information (quantization correction value) and a quantization prediction error (residual_coding) from the coded data. Note that the QP update information is a difference value from a quantization parameter prediction value qPpred, which is a prediction value of a quantization parameter QP.

(S2000: Generation of prediction image) The prediction image generation unit 308 generates a prediction image, based on the prediction information, for each block included in the target CU.

(S3000: Inverse quantization and inverse transform) The inverse quantization and inverse transform processing unit 311 performs inverse quantization and inverse transform processing on each TU included in the target CU.

(S4000: Generation of decoded image) The addition unit 312 generates a decoded image of the target CU by adding the prediction image supplied from the prediction image generation unit 308 and the prediction error supplied from the inverse quantization and inverse transform processing unit 311.

(S5000: Loop filter) The loop filter 305 generates a decoded image by applying a loop filter such as a deblocking filter, an SAO, and an ALF to the decoded image.

Processing of CT Information Decoding

Figure 9:
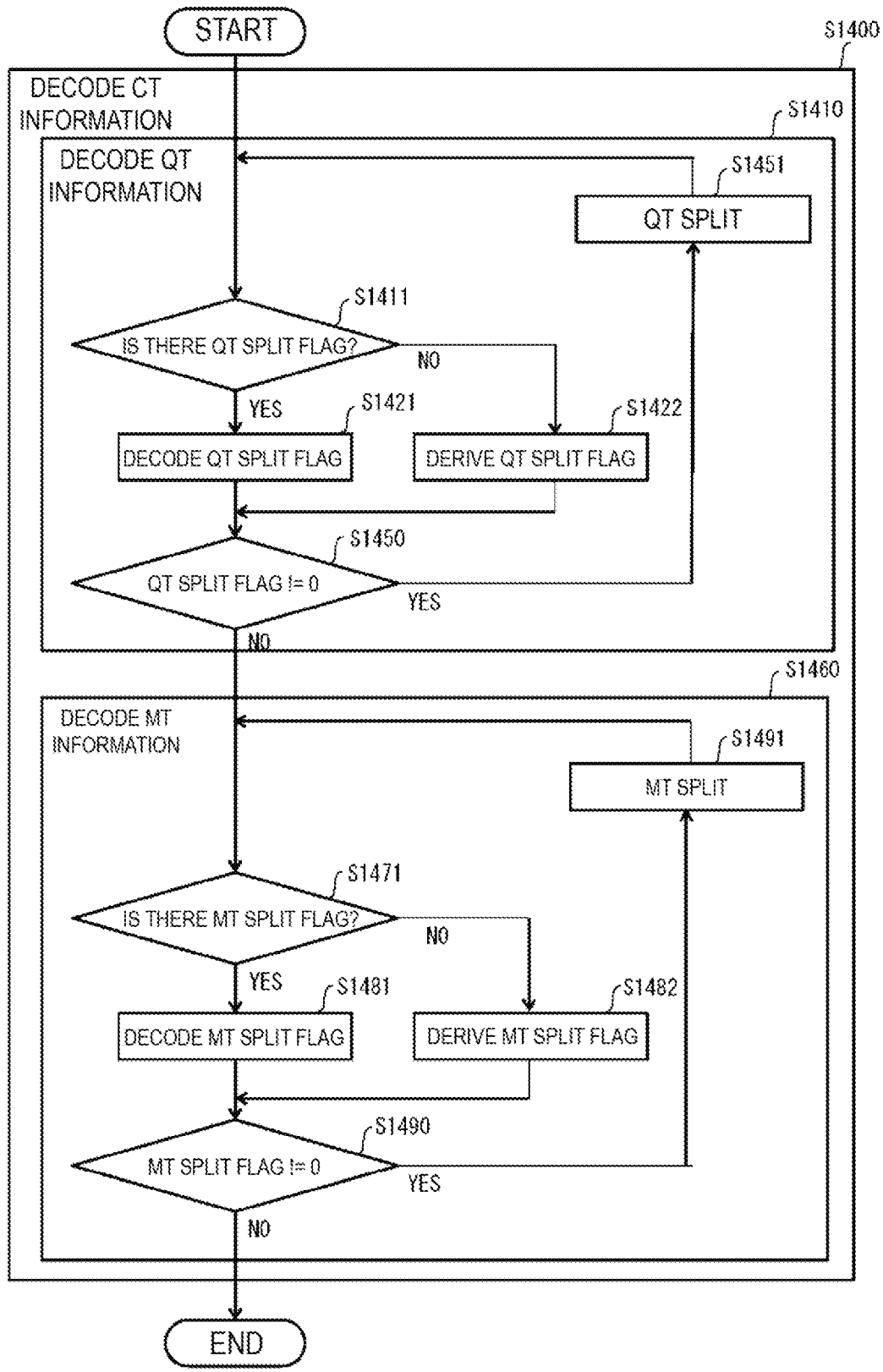
FIG. 9 is a flowchart illustrating operation of a CT information decoder.
Figure 12:
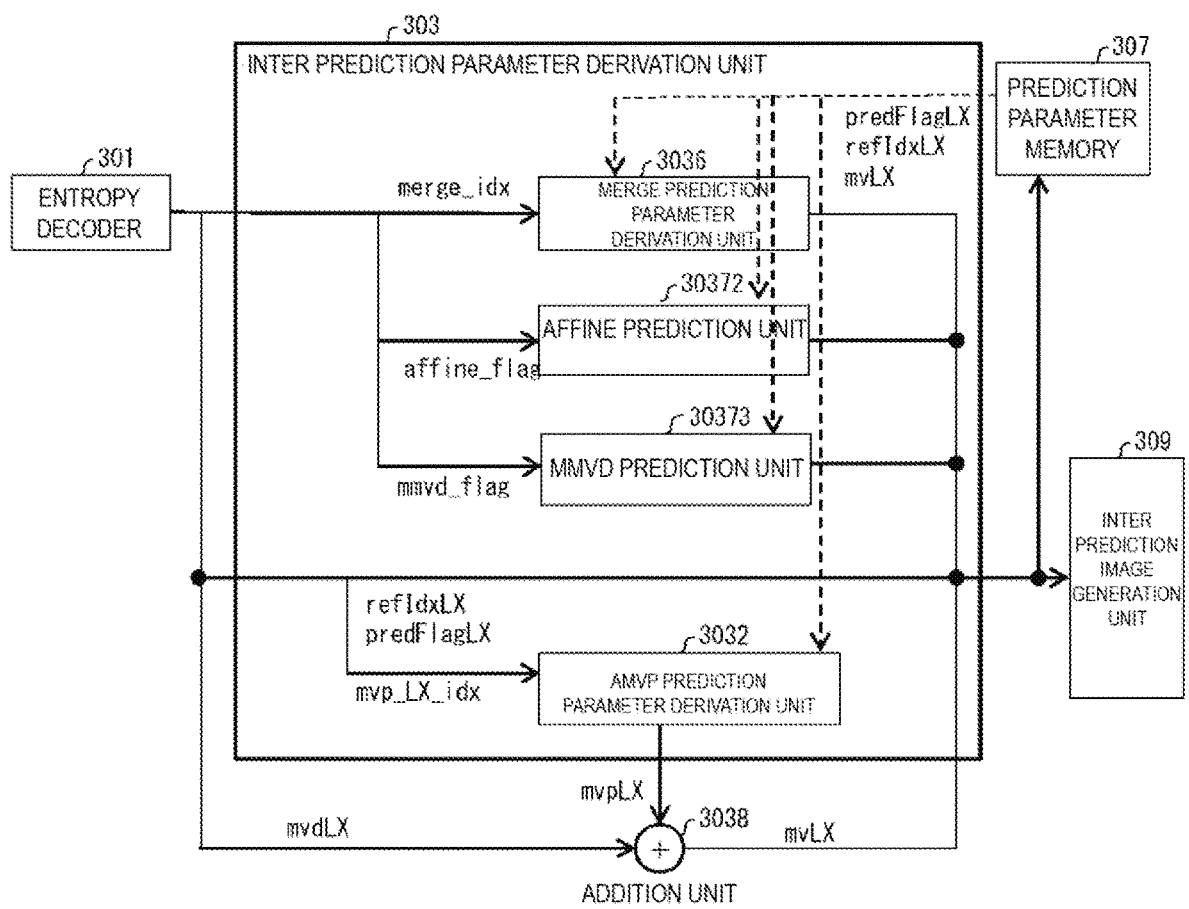
FIG. 12 is a schematic diagram illustrating a configuration of an inter prediction parameter derivation unit.
Figure 14:
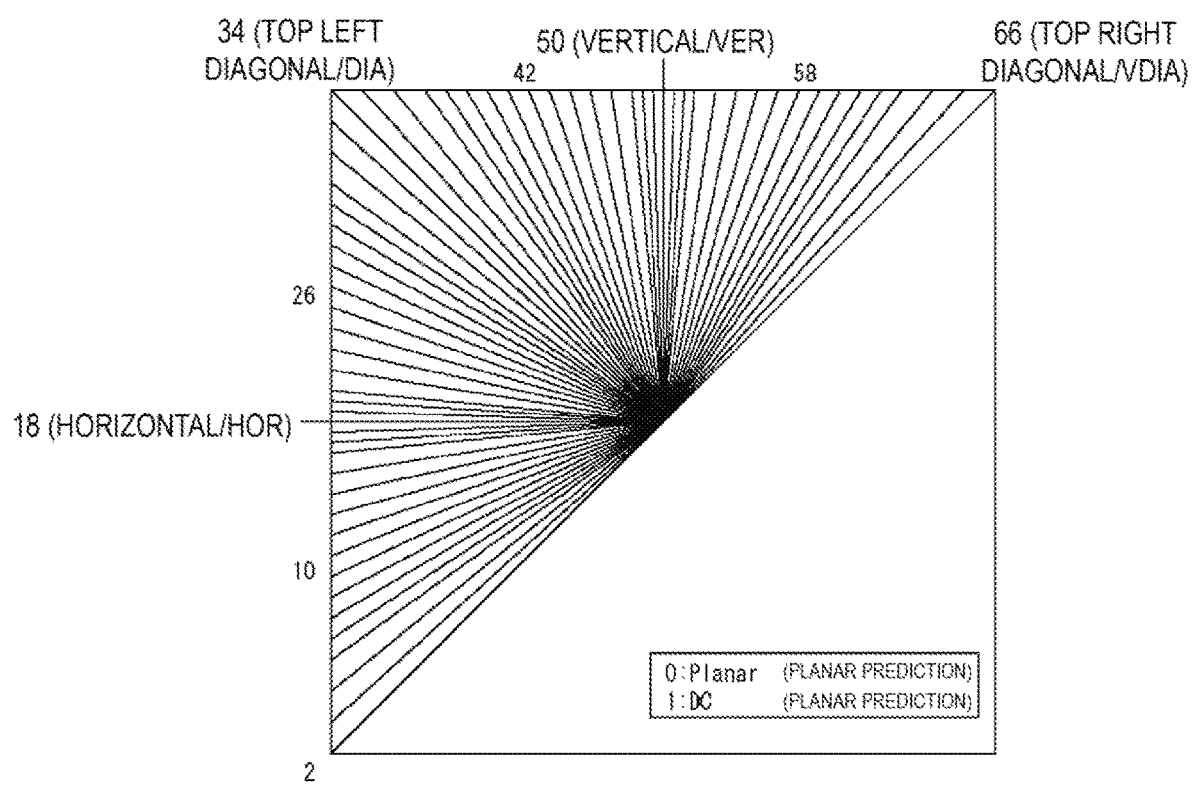
FIG. 14 is a schematic diagram illustrating types (mode numbers) of an intra prediction mode.

The processing of CT information decoding will be described below with reference to FIG. 9, FIG. 10, and FIG. 11. FIG. 9 is a flowchart illustrating operation of the CT information decoder 3021 according to an embodiment of the present invention. FIG. 10 is a diagram illustrating a configuration example of a syntax table of CTU and QT information according to an embodiment of the present invention, and FIG. 11 is a diagram illustrating a configuration example of a syntax table of MT split information according to an embodiment of the present invention.

In the following, with the CTU being a main stem, processing is performed by recursively performing splits with the coding tree CT (coding_quadtree). In the split of the coding tree CT, a common tree (treeType=SINGLE_TREE) including combined multiple color components may be used, or each color component may be used (treeType=SEPARATE_TREE). In addition, two different trees (DUAL tree) may be used between luma (Y, first color component, cIdx=0) and chroma (Cb/Cr, second, third color component, cIdx=1, 2). The tree of luma is represented by treeType=DUAL_TREE_LUMA, and the tree of chroma is represented by treeType=DUAL_TREE_CHROMA. Here, treeType is a variable for distinguishing the types of trees.

In a case that the CT information decoder 3021 uses the DUAL tree (for example, in a case that a flag qtbtt_dual_tree_intra_flag indicating the use of the intra slice and the DUAL tree is 1), as illustrated below, the CT information decoder 3021 sequentially decodes the CTU with two trees of the coding tree CT (coding_quadtree) of luma indicated by treeType=DUAL_TREE_LUMA and the coding tree (coding_quadtree) of chroma indicated by treeType=DUAL_TREE_CHROMA. Specifically, in a certain block (here, the CTU or the CTU into 64×64 blocks or more obtained by performing the QT split), the image of chroma is coded or decoded after the image of luma.

coding_quadtree(x0,y0,log 2*Cb*Size,cqtDepth,DUAL_TREE_LUMA)

coding_quadtree(x0,y0,log 2*Cb*Size,cqtDepth,DUAL_TREE_CHROMA)

In a case that the CT information decoder 3021 uses the single tree other than the above, the CT information decoder 3021 decodes a common coding tree CT (coding_quadtree) of luma and chroma as represented by treeType=SINGLE_TREE.

coding_quadtree(*xCtb,yCtb,Ctb* Log 2Size*Y*,0, SINGLE_TREE)

Note that, before branching with the DUAL tree or the single tree, the CTU may be split with the QT into an appropriate size (for example, 64×64) or more, and after being split into such an appropriate size, branch with the DUAL tree or the single tree may be performed. Such a CT is represented by dual_tree_implicit_qt_split (xCtb, yCtb, CtbLog 2SizeY, cqtDepth).

The CT information decoder 3021 decodes the CT information from the coded data, and recursively decodes the coding tree CT (coding_quadtree). Specifically, the CT information decoder 3021 decodes the QT information, and decodes a target CT coding_quadtree (x0, y0, log 2Cb Size, cqtDepth). Note that (x0, y0) is top left coordinates of the target CT, log 2Cb Size is a logarithmic CT size being a logarithm of a CT size being the size of the CT with 2 being its base, and cqtDepth is CT depth (QT depth) indicating a hierarchy of the CT.

(S1411) The CT information decoder 3021 determines whether there is a QT split flag in the decoded CT information. In a case that there is a QT split flag, the processing proceeds to S1421, otherwise the processing proceeds to S1422.

(S1421) In a case that it is determined that the logarithmic CT size log 2CbSize is larger than MinCb Log 2SizeY, the CT information decoder 3021 decodes the QT split flag (split_cu_flag).

(S1422) Otherwise, the CT information decoder 3021 omits decoding of the QT split flag split_cu_flag from the coded data, and sets the QT split flag split_cu_flag to 0.

(S1450) In a case that the QT split flag split_cu_flag is other than 0, the processing proceeds to S1451, otherwise the processing proceeds to S1471.

(S1451) The CT information decoder 3021 performs the QT split. Specifically, the CT information decoder 3021 decodes four CTs having the logarithmic CT size log 2CbSize−1, at positions (x0, y0), (x1, y0), (x0, y1), and (x1, y1) of the CT depth cqtDepth+1.

coding_quadtree(x0,y0,log 2$Cb$Size−1,cqtDepth+1, treeType)

coding_quadtree(x1,y0,log 2$Cb$Size−1,cqtDepth+1, treeType)

coding_quadtree(x0,y1,log 2$Cb$Size−1,cqtDepth+1, treeType)

coding_quadtree(x1,y1,log 2$Cb$Size−1,cqtDepth+1, treeType)

Here, (x0, y0) is top left coordinates of the target CT, and (x1, y1) is, as in the following expressions, derived by adding ½ of the CT size (1<<log 2CbSize) to (x0, y0).

$x1=x0+(1<<(\log 2Cb\text{Size}-1))$ $y1=y0+(1<<(\log 2Cb\text{Size}-1))$

1<<N is the same value as 2 to the power of N (the same applies hereinafter).

Then, as in the following expression, the CT information decoder 3021 updates the CT depth cqtDepth indicating the hierarchy of the CT and the logarithmic CT size log 2Cb Size.

cqtDepth=cqtDepth+1 log 2$Cb$ Size=log 2$Cb$Size−1

The CT information decoder 3021 continues the QT information decoding started with S1411 in lower CTs as well, by using the updated top left coordinates, logarithmic CT size, and CT depth.

After the QT split ends, the CT information decoder 3021 decodes the CT information from the coded data, and recursively decodes the coding tree CT (MT, multi_type_tree). Specifically, the CT information decoder 3021 decodes the MT split information, and decodes a target CT multi_type_tree (x0, y0, cbWidth, cbHeight, mttDepth, doft, partIdx, treeType). Note that cbWidth is the width of the CT, cbHeight is the height of the CT, mttDepth is the CT depth (MT depth) indicating a hierarchy of a multi tree, doft is depthOffset, and treeType is any one of SINGLE_TREE, DUAL_TREE_LUMA, and DUAL_TREE_CHROMA.

(S1471) The CT information decoder 3021 determines whether there is an MT split flag (split information) in the decoded CT information. In a case that there is an MT split flag, the processing proceeds to S1481. Otherwise, the processing proceeds to S1482.

(S1481) The CT information decoder 3021 decodes the MT split flag mtt_split_cu_flag.

(S1482) The CT information decoder 3021 configures the MT split flag mtt_split_cu_flag to 0, without decoding the MT split flag mtt_split_cu_flag from the coded data.

(S1490) Regarding the CT information decoder 3021, in a case that the MT split flag mtt_split_cu_flag is other than 0, the processing proceeds to S1491. Otherwise, the CT information decoder 3021 ends the processing without splitting the target CT (proceeds to decoding of the CU).

(S1491) The CT information decoder 3021 performs the MT split. The flag mtt_split_cu_vertical_flag indicating the direction of the MT split and the syntax element mtt_split_cu_binary_flag indicating whether the MT split is a binary tree or a ternary tree are decoded. partIdx of the coding nodes subjected to the MT split is assigned 0, 1, and 2 in order from the left, and is assigned 0, 1, and 2 in order from the top side to the bottom side. In a case of the BT, 0 and 1 are assigned in order. In a case that the MT split type mtt_split_cu_binary_flag is 1 (two splits) and the MT split direction mtt_split_cu_vertical_flag is 0 (horizontal split), the CT information decoder 3021 decodes the following two CTs (BT split information decoding).

multi_type_tree(x0,y0,$cb$Width,$cb$Height/2,mttDepth+1,doft,0,treeType)

multi_type_tree(x0,y1,$cb$Width,$cb$Height/2,mttDepth+1,doft,1,treeType)

In contrast, in a case that the MT split direction mtt_split_cu_vertical_flag is 1 (vertical split), the following two CTs are decoded (BT split information decoding).

multi_type_tree(x0,y0,$cb$Width/2,$cb$Height,mttDepth+1,doft,0,treeType)

multi_type_tree(x1,y0,$cb$Width/2,$cb$Height,mttDepth+1,doft,1,treeType)

Here, (x1, y1) is derived according to the following expressions.

$x1=x0+cb\text{Width}/2$ $y1=y0+cb\text{Height}/2$

In addition, cbWidth or cbHeight is updated as in the following expressions.

$cb\text{Width}=cb\text{Width}/2$ $cb\text{Height}=cb\text{Height}/2$

In a case that the MT split type mtt_split_cu_binary_flag is 0 (three splits), the CT information decoder 3021 decodes three CTs (TT split information decoding).

In a case that the MT split direction mtt_split_cu_vertical_flag is 0 (horizontal split), the following three CTs are decoded.

multi_type_tree(x0,y0,$cb$Width,$cb$Height/4,mttDepth+1,doft,0,treeType)

multi_type_tree(x0,y1,$cb$Width,$cb$Height/2,mttDepth+1,doft,1,treeType)

multi_type_tree(x0,y2,$cb$Width,$cb$Height/4,mttDepth+1,doft,2,treeType)

In contrast, in a case that the MT split direction mtt_split_cu_vertical_flag is 1 (vertical split), the following three CTs are decoded (TT split information decoding).

multi_type_tree(x0,y0,$cb$Width/4,$cb$Height,mttDepth+1,doft,0,treeType)

multi_type_tree(x1,y0,$cb$Width/2,$cb$Height,mttDepth+1,doft,1,treeType)

multi_type_tree(x2,y0,$cb$Width/4,$cb$Height,mttDepth+1,doft,2,treeType)

Here, (x1, y1) and (x2, y2) are derived as in the following expressions.

$x1=x0+cb\text{Width}/4$ $y1=y0+cb\text{Height}/4$ $x2=x0+3*cb\text{Width}/4$ $y2=y0+3*cb\text{Height}/4$ The CT information decoder 3021 continues the BT split information decoding or the TT split information decoding started with S1471 in lower CTs as well, by using the updated top left coordinates, width and height of the CT, and MT depth.

In a case that the MT split flag mtt_split_cu_flag is 0, that is, neither the QT split nor the MT split is performed, the CT information decoder 3021 decodes the CU (coding_unit (x0, y0, cbWidth, cbHeight)) with the CU decoder 3022.

Details of QT Split Flag Coding and Decoding

Regarding the top left coordinates of the CT (x0, y0) the size of the CT (1<<log 2CbSize, 1<<log 2CbSize), and picture sizes pic_width_in_luma_samples and pic_height_in_luma_samples, the CT information decoder 3021 and the CT information coder 1111 decodes qt_split_cu_flag from the coded data in a case that the following conditions are true, which includes a condition that the luma size is maxBtSize or less and a condition that the luma size is larger than minQtSize. In a case that qt_split_cu_flag is not decoded from the coded data and the following is not satisfied, qt_split_cu_flag=0 is derived, and the QT split is not performed.

> (x0+(1<<log 2CbSize)<=pic_width_in_luma_samples)?1:0)+((y0+(1<<log 2CbSize)<=pic_height_in_luma_samples)?1:0)+(((1<<log 2CbSize)<=maxBtSize)?1:0))>=2&&(1<<log 2CbSize)>minQtSize)

Here, maxBtSize and minQtSize are each a variable for restricting the split size.

The CT information decoder 3021 and the CT information coder 1111 may configure different values between a case that a common tree is used and a case that a chroma tree of the DUAL tree is used, with treeType being used as a condition as follows.

> minQtSize=(treeType==DUAL_TREE_CHROMA)?

MinQtSizeC:MinQtSizeY

> maxBtSize=(treeType==DUAL_TREE_CHROMA)?

MaxBtSizeC:MaxBtSizeY

The CT information decoder 3021 and the CT information coder 1111 may decode and code syntax slice_log 2_diff_min_qt_min_cb_luma and slice_log 2_diff_min_qt_min_cb_chroma from the coded data, and derive MinQtSizeY and MinQtSizeC as follows.

> MinQt Log 2SizeY=MinCb Log 2SizeY+slice_log 2_diff_min_qt_min_cb_luma

> MinQt Log 2SizeC=MinCb Log 2SizeY+slice_log 2_diff_min_qt_min_cb_chroma

> MinQtSizeY=1<<MinQt Log 2SizeY

> MinQtSizeC=1<<MinQt Log 2SizeC

Details of MT Split Flag Coding and Decoding

Figure 15:
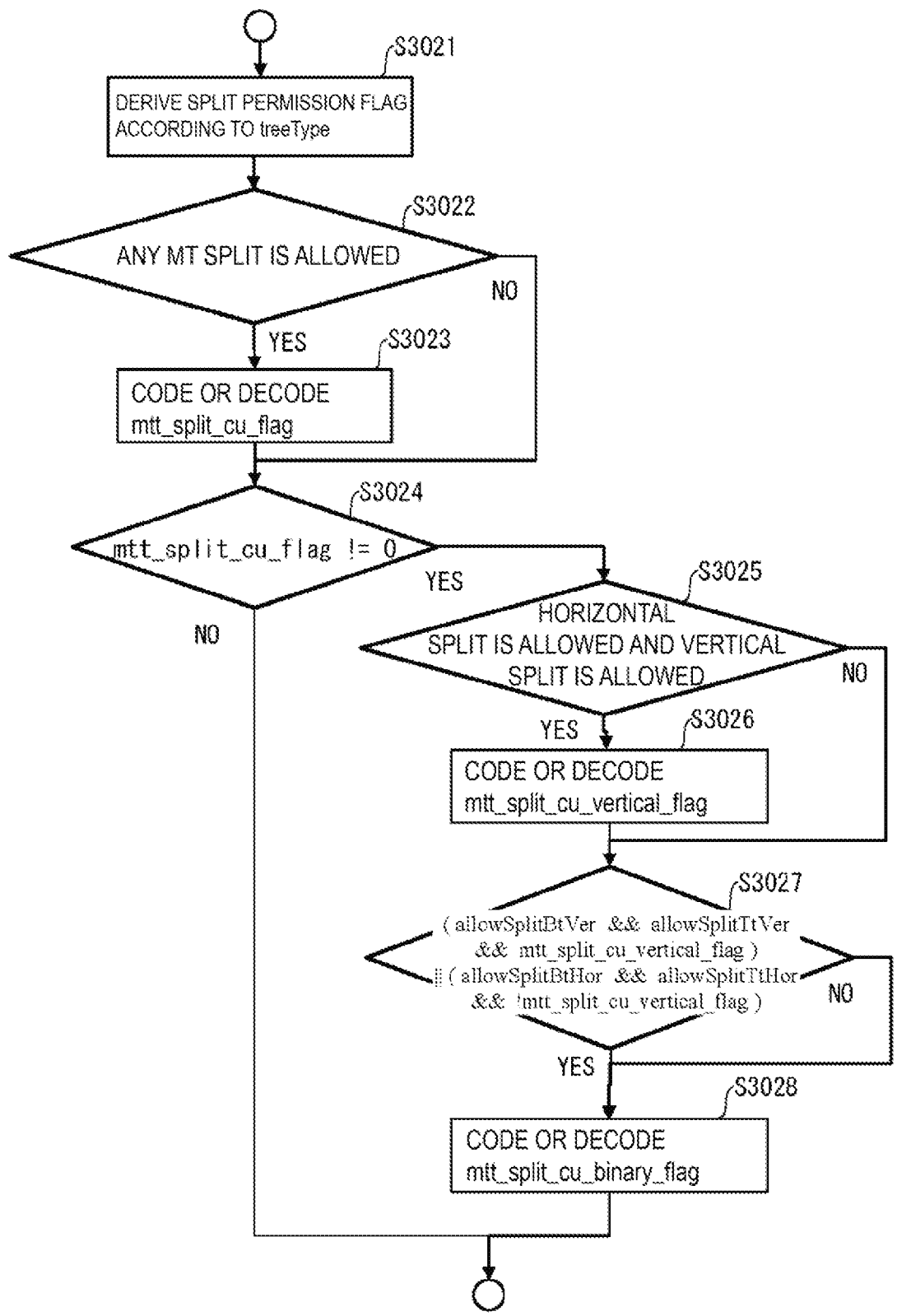
FIG. 15 is a flowchart illustrating coding and decoding of an MT split flag according to the present embodiment.

FIG. 15 is a flowchart illustrating coding and decoding of the MT split flag according to the present embodiment.

The CT information decoder 3021 and the CT information coder 1111 decode or code mtt_split_cu_flag, mtt_split_cu_binary_flag, and mtt_split_cu_vertical_flag through the following processing.

S3021 The CT information decoder 3021 or the CT information coder 1111 may derive flags allowBtSplitVer, allowBtSplitHor, allowTtSplitVer, and allowTtSplitHor indicating whether a split is allowed for each split pattern (SPLIT_BT_VER, SPLIT_BT_HOR, SPLIT_TT_VER, SPLIT_TT_HOR) in the CT node being located at the position (xCb, yCb) and having the width cbWidth and the height cbHeight. Derivation of the split flag according to the split tree typeTree will be described later.

S3022 In a case that the split allow flags (allowBtSplitVer, allowBtSplitHor, allowTtSplitVer, allowTtSplitHor) indicate that any of the BT splits is allowed or any of the TT splits is allowed (allowSplitBtVer||allowSplitBtHor||allowSplitTtVer||allowSplitTtHor), the processing proceeds to S3023, otherwise 0 is configured without coding or decoding mtt_split_cu_flag, and the processing proceeds to S3024.

S3023 In a case that the split allow flags indicate that the BT split is allowed or that the TT split is allowed, mtt_split_cu_flag is coded or decoded.

S3024 In a case that the MT split is performed (mtt_split_cu_flag is other than 0), the processing proceeds to S3025. Otherwise, coding or decoding of the MT split flag is ended, and the CU is coded or decoded.

S3025 In a case that both of the horizontal split and the vertical split are allowed (allowSplitBtHor||allowSplitTtHor) && (allowSplitBtVer||allowSplitTtVer), the processing proceeds to S3026, and mtt_split_cu_flag is coded or decoded. A case that the horizontal split is allowed refers to a case that the BT horizontal split or the TT horizontal split is allowed (allowSplitBtHor||allowSplitTtHor). A case that the vertical split is allowed refers to a case that the BT vertical split or the TT vertical split is allowed (allowSplitBtVer||allowSplitTtVer). Otherwise, the processing proceeds to S3027.

S3027 In a case that the BT vertical split is allowed and the TT vertical split is allowed and mtt_split_cu_vertical_flag is 1, or the BT horizontal split is allowed and the TT horizontal split is allowed and mtt_split_cu_vertical_flag is 0 (allowSplitBtVer && allowSplitTtVer && mtt_split_cu_vertical_flag)||(allowSplitBtHor && allowSplitTtHor && ! mtt_split_cu_vertical_flag), the processing proceeds to S3028, and mtt_split_cu_binary_flag is coded or decoded. Otherwise, the processing proceeds to S3027. mtt_split_cu_binary_flag is decoded as 1.

Example 1 of Chroma Intra Block Restriction

A configuration of restricting a 2×2 chroma intra block will be described.

The parameter decoder 302 may perform the following split restriction in decoding of the CT split flag.

Figure 16:
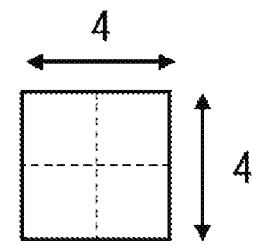
FIG. 16 is a diagram illustrating QT split restriction of chroma according to the present embodiment.

FIG. 16 is a diagram illustrating the QT split restriction of chroma according to the present embodiment.

In a case that the DUAL_TREE is used and the block size is 8×8 (chroma 4×4), the parameter decoder 302 restricts the QT split. Specifically, in the chroma block size cbWidthC and cbHeightC, the parameter decoder 302 decodes qt_split_cu_flag only in a case that (tree_type !=DUAL_TREE_CHROMA||cbWidthC>4). Otherwise, qt_split_cu_flag is set to 0.

Note that, in the luma block size cbWidth and cbHeight, the following may be performed.

qt_split_cu_flag may be decoded only in a case that (tree_type !=DUAL_TREE_CHROMA||cbWidth>8). In addition, the following may further be performed by using a sample ratio between the color components.

qt_split_cu_flag is decoded only in a case that (tree_type !=DUAL_TREE_CHROMA||cbWidthC/SubWidthC>4).

Note that in a case that the restriction according to the present embodiment is performed in a case other than DUAL_TREE_CHROMA, 4×4 blocks of luma cannot be coded or decoded. Reduction in coding efficiency in this case is remarkably significant, and thus it is appropriate that this reduction be avoided.

Derivation of Split Minimum Size Used for Chroma Tree

Note that the parameter decoder 302 may restrict the QT split in a case of 8×8 (chroma 4×4) by configuring a minimum size MinQtSizeC of the QT split used for the case of DUAL_TREE_CHROMA to 8 or larger.

MinQtSizeC=Max(8,1<<MinQt Log 2SizeC))

Further, a minimum value to be restricted in a logarithmic expression may be configured.

MinQt Log 2SizeC=Min(3,MinCb Log 2SizeY+
    slice_log 2_diff_min_qt_min_cb_chroma)

In the above configuration, the QT split in a case of 2×2 with respect to chroma is restricted. This produces an effect of preventing processing delay caused by chroma intra prediction in a case that the chroma block is 2×2.

As described below, in a case of deriving the minimum QT split size MinQtSizeC in a case of DUAL_TREE_CHROMA used for chroma, the derivation to the size obtained by adding 1 to syntax related to the signaled minimum QT split size may be performed.

MinQt Log 2SizeY=MinCb Log 2SizeY+slice_log
    2_diff_min_qt_min_cb_luma

MinQt Log 2SizeC=MinCb Log 2SizeY+1+slice_log
    2_diff_min_qt_min_cb_chroma

MinQtSizeY=1<<MinQt Log 2SizeY

MinQtSizeC=1<<MinQt Log 2SizeC

Specifically, the parameter decoder 302 derives a logarithmic value of the minimum QT split size of certain luma from the sum of the variable MinCb Log 2SizeY common to luma and chroma and syntax slice_log 2_diff_min_qt_min_cb_luma of the luma, and derives a logarithmic value of the minimum QT split size of certain chroma from the sum of the variable MinCb Log 2SizeY common to luma and chroma and syntax slice_log 2_diff_min_qt_min_cb_chroma of the chroma+1.

In this case, the minimum value of MinQtSizeY is syntax slice_log 2_diff_min_qt_min_cb_luma=0 and slice_log 2_diff_min_qt_min_cb_chroma=0, the minimum value of MinQtSizeY is 1<<MinCb Log 2SizeY, and the minimum value of MinQtSizeC is 1<<(MinCb Log 2SizeY+1). In a case that the minimum value of MinCb Log 2SizeY is 2, MinQtSizeY=4 and MinQtSizeC=8 are minimum QT split sizes of luma and chroma, respectively.

In the above configuration, the QT split in a case of 2×2 is restricted in the case of chroma of the case of the DUAL tree. This produces an effect of preventing processing delay caused by chroma intra prediction in a case that the chroma block is 2×2.

In addition, the parameter decoder 302 may add 1 in derivation of the logarithmic value of the minimum QT split size in a case of DUAL_TREE_CHROMA, only in a case that SubWidthC or SubHeight is 2. Specifically, the derivation may be performed as follows.

MinQt Log 2SizeC=MinCb Log 2SizeY+
    ((SubWidthC==2||SubHeightC==2)?1:0)+slice_
    log 2_diff_min_qt_min_cb_chroma The same applies hereinafter.

MinQtSizeC=1<<(MinQt Log 2SizeC+
    ((SubWidthC==2||SubHeightC==2)?1:0))

The same applies hereinafter.

In a case of (SubWidthC==2||SubHeightC==2), MinQtSizeC=MinQtSizeC*2

Note that only SubWidthC may be referred to as in one of the following.

MinQt Log 2SizeC=MinCb Log 2SizeY+((Sub-
    WidthC==2)?1:0)+slice_log 2_diff_min_qt_
    min_cb_chroma Alternatively, MinQtSizeC=1<<(MinQt Log 2SizeC+
    ((SubWidthC==2)?1:0))

Alternatively, in a case of (SubWidthC==2), MinQtSizeC=MinQtSizeC*2

In this case, the split restriction of the QT is performed not only in a case of 4:2:0 but also in a case of 4:2:2.

In the above configuration, in a case that SubWidthC or SubHeightC is 2, which indicates that subsampling of chroma is performed, the QT split of 2×2 of chroma in the DUAL tree is restricted. This produces an effect of preventing processing delay caused by chroma intra prediction in a case that the chroma block is 2×2.

In a case of indicating 4:2:0 (for example, in a case that chroma_format_idc==1), 1 may be added in derivation of the logarithmic value of the minimum QT split size of chroma. Specifically, the derivation may be performed as follows. MinQt Log 2SizeC=MinCb Log 2SizeY+(chroma_format_idc==1)?1:0)+slice_log 2_diff_min_qt_min_cb_chroma The same applies hereinafter.

MinQtSizeC=1<<(MinQt Log 2SizeC+(chroma_for-
    mat_idc==1)?1:0))

The same applies hereinafter.

In a case of (chroma_format_idc==1), MinQtSizeC=MinQtSizeC*2

In a similar manner, in a case of indicating 4:2:2 (for example, in a case that chroma_format_idc==2), the above processing may be performed. In each of the above configurations, the QT split of 2×2 of chroma is restricted in 4:2:0 or 4:2:2 in which subsampling of chroma is performed. This produces an effect of preventing processing delay caused by chroma intra prediction in a case that the chroma block is 2×2.

BT Split Restriction 1

Figure 17:
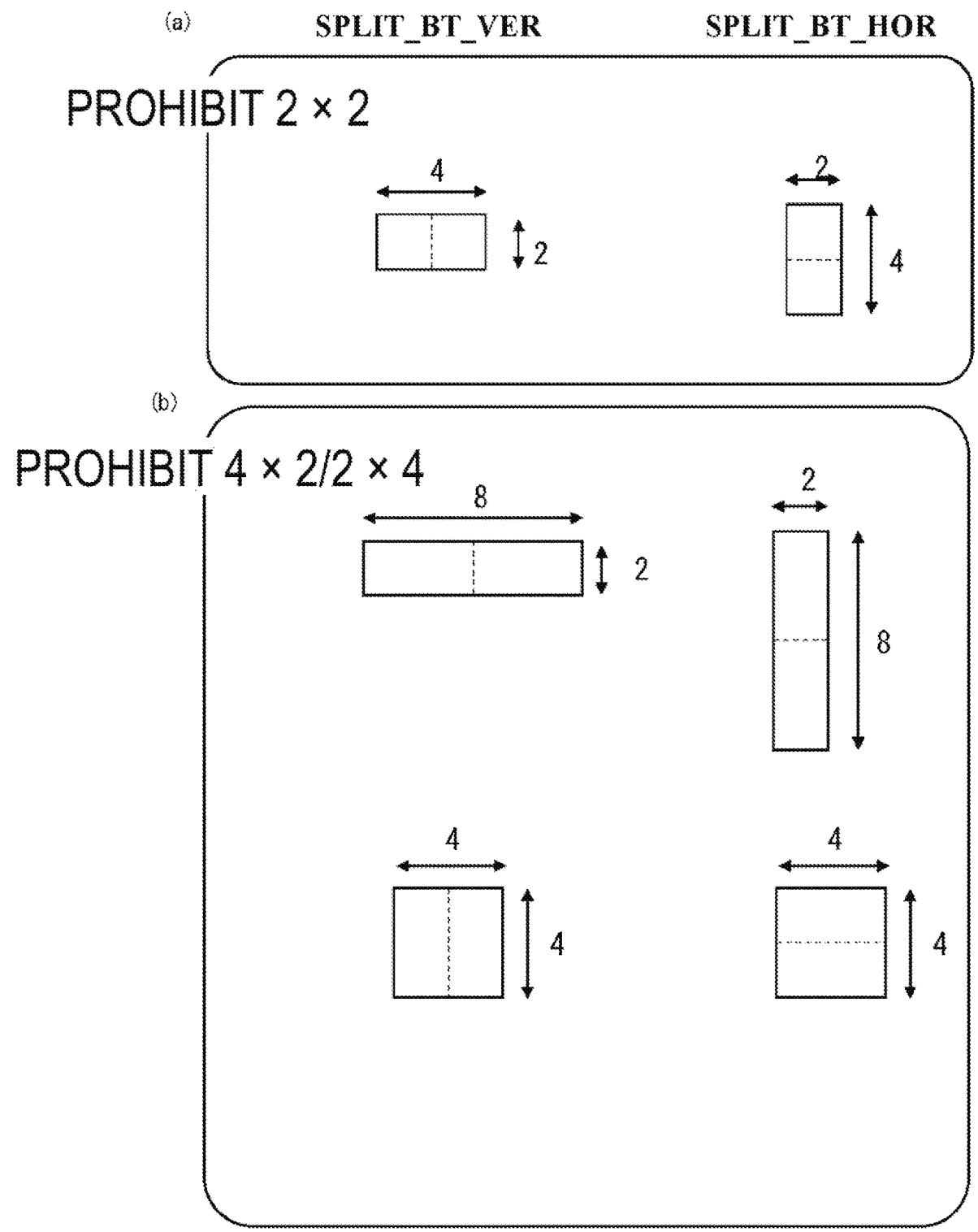
FIG. 17 is a diagram illustrating BT split restriction of chroma according to the present embodiment.

FIG. 17 is a diagram illustrating the BT split restriction of chroma according to the present embodiment. As illustrated in FIG. 17(a), the BT split of a chroma block of 4×2 and 2×4 is restricted. Specifically, in the chroma block size cbWidthC and cbHeightC, the parameter decoder 302 decodes mtt_split_cu_flag only in a case that (tree_type !=DUAL_TREE_CHROMA||(cbWidthC+cbHeightC)>6)). Otherwise, mtt_split_cu_flag is set equal to 0. Note that, in the luma block size cbWidth and cbHeight, the following may be performed.

mtt_split_cu_flag may be decoded only in a case that (tree_type !=DUAL_TREE_CHROMA||(cbWidth+cbHeight)>12)). The following may further be performed by using a sample ratio between the color components.

mtt_split_cu_flag is decoded only in a case that (tree_type !=DUAL_TREE_CHROMA||(cbWidthC/SubWidthC+cbHeightC/SubHeightC)>6)).

In the above configuration, the BT split in a case of 4×2/2×4 is restricted (allowBtSplit is false) in a case that the tree type treeType is DUAL_TREE_CHROMA. This produces an effect of preventing processing delay caused by chroma intra prediction in a case that the chroma block is 2×2. Note that the same effect can also be obtained in the configuration of BT Split Restriction 2 using the split allow flags to be described later.

As illustrated in FIG. 17(b), the BT split of the chroma block of 8×2/2×8/4×4 may further be restricted. Specifically, in the chroma block size cbWidthC and cbHeightC, the parameter decoder 302 decodes mtt_split_cu_flag only in a case that (tree_type !=DUAL_TREE_CHROMA||(cbWidthC+cbHeightC)>8)). Otherwise, mtt_split_cu_flag is set equal to 0.

Note that, in the luma block size cbWidth and cbHeight, the following may be performed.

mtt_split_cu_flag may be decoded only in a case that (tree_type !=DUAL_TREE_CHROMA||(cbWidth+cbHeight)>16)). In addition, the following may further be performed by using a sample ratio between the color components.

mtt_split_cu_flag is decoded only in a case that (tree_type !=DUAL_TREE_CHROMA||(cbWidthC/SubWidthC+cbHeightC/SubHeightC)>8)).

The following may be performed.

mtt_split_cu_flag is decoded only in a case that (tree_type !=DUAL_TREE_CHROMA||(cbWidthC/SubWidthC)*cbHeightC/SubHeightC)>16)).

In the above configuration, the BT split in a case of 4×2/2×4/8×2/2×8/4×4 is restricted (allowBtSplit is false) in a case that the tree type treeType is DUAL_TREE_CHROMA. This produces an effect of preventing processing delay caused by chroma intra prediction in a case that the chroma block is 2×2/4×2/2×4. Note that the same effect can also be obtained in the configuration of BT Split Restriction 2 using the split allow flags to be described later.

TT Split Restriction 1

Figure 18:
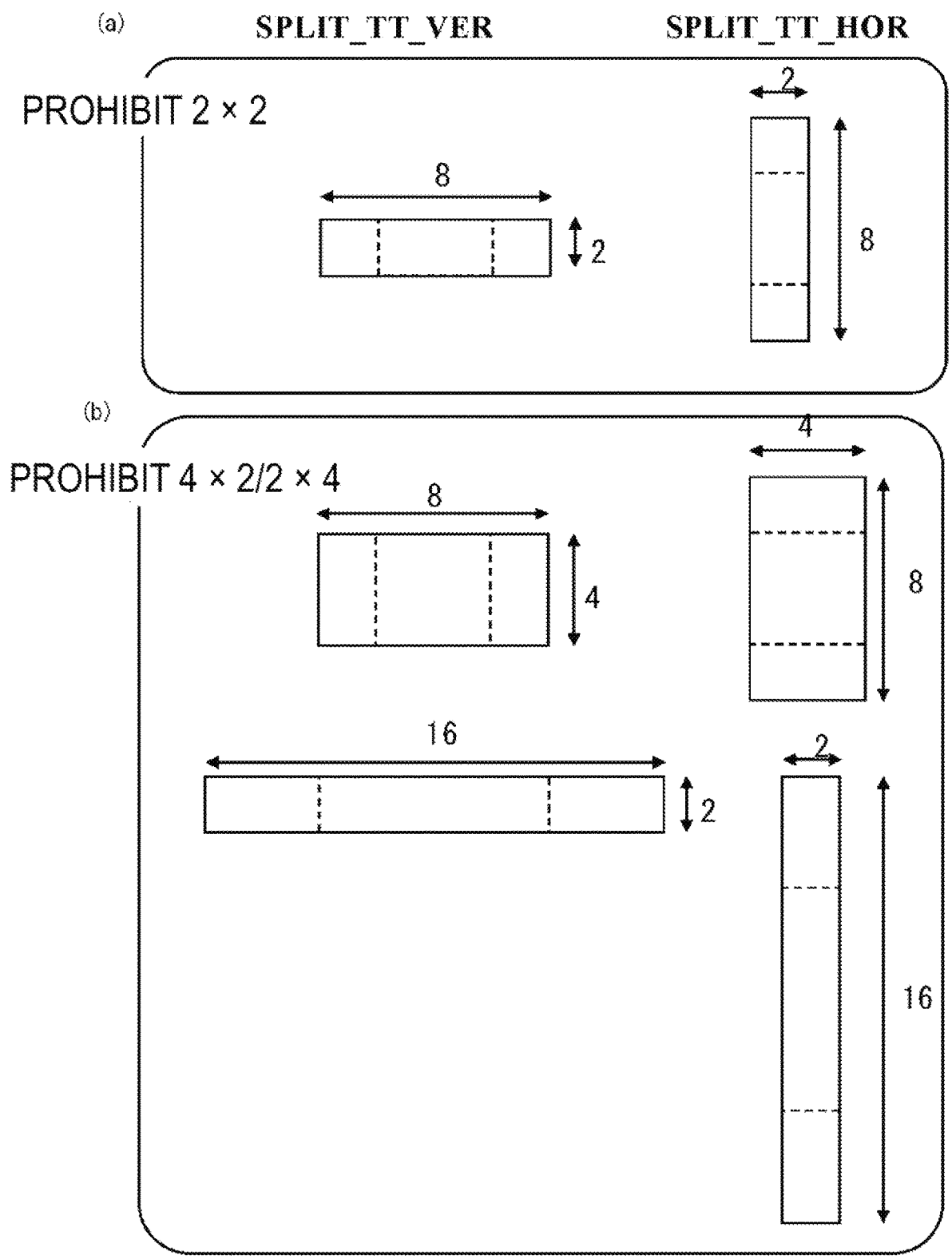
FIG. 18 is a diagram illustrating TT split restriction of chroma according to the present embodiment.

FIG. 18 is a diagram illustrating the TT split restriction of chroma according to the present embodiment. As illustrated in FIG. 18(a), the TT split of the chroma block of 8×2/2×8 is restricted. Note that, the BT split (mtt_split_cu_binary_flag=1) can be used also in a case that the TT split (mtt_split_cu_binary_flag=0) is restricted, and thus, here, decoding of mtt_split_cu_binary_flag is omitted and 0 (BT split) is configured. Specifically, in the chroma block size cbWidthC and cbHeightC, the parameter decoder 302 decodes mtt_split_cu_binary_flag only in a case that (tree_type !=DUAL_TREE_CHROMA||(cbWidthC+cbHeightC)>10)). Otherwise, mtt_split_cu_binary_flag is set equal to 0.

Note that, in the luma block size cbWidth and cbHeight, the following may be performed.

mtt_split_cu_binary_flag may be decoded only in a case that (tree_type !=DUAL_TREE_CHROMA||(cbWidth+cbHeight)>20)). In addition, the following may further be performed by using a sample ratio between the color components.

mtt_split_cu_binary_flag is decoded only in a case that (tree_type !=DUAL_TREE_CHROMA||(cbWidthC/SubWidthC+cbHeightC/SubHeightC)>10)). The following may be performed.

mtt_split_cu_binary_flag is decoded only in a case that (tree_type !=DUAL_TREE_CHROMA||(cbWidthC/SubWidthC)*(cbHeightC/SubHeightC)>16)).

In the above configuration, the TT split in a case of 8×2/2×8 is restricted (allowTtSplit is false) in a case that the tree type treeType is DUAL_TREE_CHROMA. This produces an effect of preventing processing delay caused by chroma intra prediction in a case that the chroma block is 2×2.

As illustrated in FIG. 18(b), further, the TT split of the chroma block of 8×4/4×8/16×2/2×16 may be restricted. Note that, the BT split (mtt_split_cu_binary_flag=1) can be used also in a case that the TT split (mtt_split_cu_binary_flag=0) is restricted, and thus, here, decoding of mtt_split_cu_binary_flag is omitted and 0 (BT split) is configured.

Specifically, in the chroma block size cbWidthC and cbHeightC, the parameter decoder 302 decodes mtt_split_cu_binary_flag only in a case that (tree_type !=DUAL_TREE_CHROMA||(cbWidthC+cbHeightC)>12)).

Note that, in the luma block size cbWidth and cbHeight, the following may be performed.

mtt_split_cu_binary_flag may be decoded only in a case that (tree_type !=DUAL_TREE_CHROMA||(cbWidth+cbHeight)>24)). In addition, the following may further be performed by using a sample ratio between the color components.

mtt_split_cu_binary_flag is decoded only in a case that (tree_type !=DUAL_TREE_CHROMA||(cbWidthC/SubWidthC+cbHeightC/SubHeightC)>12)). The following may be performed.

mtt_split_cu_binary_flag is decoded only in a case that (tree_type !=DUAL_TREE_CHROMA||(cbWidthC/SubWidthC)*(cbHeightC/SubHeightC)>32)).

In the above configuration, the TT split in a case of 8×2/2×8/8×4/4×8/16×2/2×16 is restricted (allowTtSplit is false) in a case that the tree type treeType is DUAL_TREE_CHROMA. This produces an effect of preventing processing delay caused by chroma intra prediction in a case that the chroma block is 2×2/4×2/2×4.

Derivation of Split Allow Flags

BT Split Restriction 2

The details of split permission flag derivation (S3021) of FIG. 15 will be described below with respect to the BT split. The CT information decoder 3021 or the CT information coder 1111 may derive allowBtSplit (allowBtSplitHor or allowBtSplitVer) of the BT split with the following expressions in order to restrict the chroma block of 2×2. In a case that whether SPLIT_BT_VER is allowed is derived (btSplit=SPLIT_BT_VER), the following allowBtSplit is configured to allowBtSplitVer, and in a case that whether SPLIT_BT_HOR is allowed is derived (btSplit=SPLIT_BT_HOR), the following allowBtSplit is configured to allowBtSplitHor.

In a case that any of the following conditions is true, allowBtSplit is derived as false.

$cbSize<=MinBtSizeY$ $cbWidth>maxBtSize$ $cbHeight>maxBtSize$ $mttDepth>=maxMttDepth$ In a case that all of the following conditions are true other than the above, allowBtSplit is derived as false.

$btSplit==SPLIT\_BT\_VER$ $y0+cbHeight>pic\_height\_in\_luma\_samples$

In a case that all of the following conditions are true other than the above, allowBtSplit is derived as false.

$btSplit=SPLIT\_BT\_HOR$ $x0+cbWidth>pic\_width\_in\_luma\_samples$ $y0+cbHeight<=pic\_height\_in\_luma\_samples$ In a case that all of the following conditions are true other than the above, allowBtSplit is derived as false.

mttDepth>0 partIdx=1

MttSplitMode[x0][y0][mttDepth−1]=parallelTtSplit

In a case that all of the following conditions are true other than the above, allowBtSplit is derived as false.

btSplit=SPLIT_BT_VER cbWidth<=MaxTbSizeY cbHeight>MaxTbSizeY

In a case that all of the following conditions are true other than the above, allowBtSplit is derived as false.

btSplit=SPLIT_BT_HOR cbWidth>MaxTbSizeY cbHeight<=MaxTbSizeY

In a case that all of the following conditions are true other than the above, allowBtSplit is derived as false (determination B1).

treeType==DUAL_TREE_CHROMA &&
    btSplit==SPLIT_BT_VER && (cbWidth/Sub-
    WidthC==4 && cbHeight/SubHeightC==2)|| treeType==DUAL_TREE_CHROMA &&
    btSplit==SPLIT_BT_HOR && (cbWidth/Sub-
    WidthC==2 && cbHeight/SubHeightC==4)

In a case other than the above, allowBtSplit is derived as true.

Note that the order of the above conditions is may be arbitrary order except for a case that the last allowBtSplit is derived as true. As described above, in 4:2:0, SubWidthC=SubHeightC=2.

Note that, instead of determination B1, the following determination B2 can be used. Here, determination is performed by using the size ((cbWidth/SubWidthC)*(cbHeight/SubHeightC)) of the chroma block, without referring to the direction btSplit of branch.

In a case that all of the following conditions are true other than the above, allowBtSplit is derived as false (determination B2).

treeType==DUAL_TREE_CHROMA (cbWidth/SubWidthC)*(cbHeight/SubHeightC)<=8

The following determination B3 may be performed.

In a case that all of the following conditions are true other than the above, allowBtSplit is derived as false (determination B3).

treeType==DUAL_TREE_CHROMA (cbWidth/SubWidthC)+(cbHeight/SubHeightC)<=6

In the above configuration, in determinations B1, B2, and B3, the BT split of 4×2/2×4 is restricted (allowBtSplit is false) in a case that the tree type treeType is DUAL_TREE_CHROMA. This produces an effect of preventing processing delay caused by chroma intra prediction in a case that the chroma block is 2×2.

In addition, the BT split in a case of 8×2/2×8/4×4 may also be restricted, so that the chroma block may be prevented from being 4×2/2×4. In this case, a range value of the determination is configured as follows.

In a case that the following conditions are true other than the above, allowBtSplit is derived as false (determination B1').

treeType==DUAL_TREE_CHROMA &&
    btSplit==SPLIT_BT_VER && (cbWidth/Sub-
    WidthC==4 && cbHeight/SubHeightC==2)|| treeType==DUAL_TREE_CHROMA &&
    btSplit==SPLIT_BT_HOR && (cbWidth/Sub-
    WidthC==2 && cbHeight/SubHeightC==4)|| treeType==DUAL_TREE_CHROMA &&
    btSplit==SPLIT_BT_VER && (cbWidth/Sub-
    WidthC==8 && cbHeight/SubHeightC==2)|| treeType==DUAL_TREE_CHROMA &&
    btSplit==SPLIT_BT_HOR && (cbWidth/Sub-
    WidthC==2 && cbHeight/SubHeightC==8)|| treeType==DUAL_TREE_CHROMA&&(cbWidth/
    SubWidthC==4&&cbHeight/SubHeightC==4)

The following determination B2' may be performed.

In a case that all of the following conditions are true other than the above, allowBtSplit is derived as false (determination B2').

treeType==DUAL_TREE_CHROMA (cbWidth/SubWidthC)*(cbHeight/SubHeightC)<=16

The following determination B3' may be performed

In a case that all of the following conditions are true other than the above, allowBtSplit is derived as false (determination B3').

treeType==DUAL_TREE_CHROMA (cbWidth/SubWidthC)+(cbHeight/SubHeightC)<=12

In the above configuration, in determinations B1', B2', and B3', the BT split in a case of 4×2/2×4/8×2/2×8/4×4 is restricted (allowBtSplit is false) in a case that the tree type treeType is DUAL_TREE_CHROMA. This produces an effect of preventing processing delay caused by chroma intra prediction in a case that the chroma block is 2×2/4×2/2×4.

TT Split Restriction 2

The details of split permission flag derivation (S3021) of FIG. 15 will be described below with respect to the TT split. The CT information decoder 3021 or the CT information coder 1111 may derive allowTtSplit (allowTtSplitHor or allowTtSplitVer) of the TT split with the following expressions in order to restrict the chroma block of 2×2. In a case that whether SPLIT_TT_VER is allowed is derived (btSplit=SPLIT_TT_VER), the following allowTtSplit is configured to allowTtSplitVer, and in a case that whether SPLIT_TT_HOR is allowed is derived (btSplit=SPLIT_TT_HOR), the following allowTtSplit is configured to allowTtSplitHor.

In a case that any of the following is true, false is derived for allowTtSplit.

cbSize<=2*MinTtSizeY cbWidth>Min(MaxTbSizeY,maxTtSize)

cbHeight>Min(MaxTbSizeY,maxTtSize)

mttDepth>=maxMttDepth x0+cbWidth>pic_width_in_luma_samples y0+cbHeight>pic_height_in_luma_samples In a case that any of the following is true, false is derived for allowTtSplit (determination T1).

treeType==DUAL_TREE_CHROMA&&(cbWidth/
SubWidthC==8&&cbHeight/SubHeightC==2)|| treeType==DUAL_TREE_CHROMA&&(cbWidth/
SubWidthC==2&&cbHeight/SubHeightC==8)|| treeType==DUAL_TREE_CHROMA&&(cbWidth/
SubWidthC==4&&cbHeight/SubHeightC==4)

In a case other than the above, allowTtSplit is derived as true.

Note that, instead of determination T1, the following determination T2 can be used. Here, determination is performed by using the size ((cbWidth/SubWidthC)*(cbHeight/SubHeightC)) of the chroma block, regardless of the direction btSplit of branch.

In a case that all of the following conditions are true other than the above, allowTtSplit is derived as false (determination T2).

treeType==DUAL_TREE_CHROMA (cbWidth/SubWidthC)*(cbHeight/SubHeightC)<=16

The following determination T3 may be performed

In a case that all of the following conditions are true other than the above, allowTtSplit is derived as false (determination T3).

treeType==DUAL_TREE_CHROMA (cbWidth/SubWidthC)+(cbHeight/SubHeightC)<=10

In the above configuration, in the determination T1, determination T2, and determination T3, the TT split in a case of 8×2/2×8 is restricted (allowTtSplit is false) in a case that the tree type treeType is DUAL_TREE_CHROMA. This produces an effect of preventing the chroma block from being 2×2.

In addition, the TT split in a case of 8×4/4×8/16×2/2×16 may also be restricted, so that the chroma block may be prevented from being 8×2/2×8. In this case, a range value of the determination is configured as follows (determination T1').

treeType==DUAL_TREE_CHROMA&&(cbWidth/
SubWidthC==8&&cbHeight/SubHeightC==4)|| treeType==DUAL_TREE_CHROMA&&(cbWidth/
SubWidthC==4&&cbHeight/SubHeightC==8)|| treeType==DUAL_TREE_CHROMA&&(cbWidth/
SubWidthC==16&&cbHeight/Sub-
HeightC==2)|| treeType==DUAL_TREE_CHROMA&&(cbWidth/
SubWidthC==2&&cbHeight/SubHeightC==16)

In a case other than the above, allowTtSplit is derived as true.

Note that, instead of determination T1', the following determination T2' can be used.

In a case that all of the following conditions are true other than the above, allowTtSplit is derived as false (determination T2').

treeType==DUAL_TREE_CHROMA (cbWidth/SubWidthC)*(cbHeight/SubHeightC)<=32

The following determination T3' may be performed

In a case that all of the following conditions are true other than the above, allowTtSplit is derived as false (determination T3').

treeType==DUAL_TREE_CHROMA (cbWidth/SubWidthC)+(cbHeight/SubHeightC)<=18

In the above configuration, in determination T1', determination T2', and determination T3', the TT split in a case of 8×4/4×8/16×2/2×16 is restricted (allowTtSplit is false) in a case that the tree type treeType is DUAL_TREE_CHROMA. This produces an effect of preventing processing delay caused by chroma intra prediction in a case that the chroma block is 2×2/4×2/2×4.

Supplement

As described above, in the DUAL tree of chroma, the CT information decoder and the CT information coder may derive 0 without decoding qt_split_cu_flag in a case of the 8×8 block in a luma size, may derive 0 without decoding mtt_split_cu_flag in a case of the 8×4/4×8 block in a luma size, and may derive 0 without decoding mtt_split_cu_binary_flag in a case of the 16×4/4×16 block in a luma size.

According to the configuration of QT restriction+TT split restriction+BT split restriction described above, the CT information decoder 3021 or the CT information coder 1111 performs operation of the following configuration A or configuration B.

(Configuration A) FIG. 16, FIG. 17(a), and FIG. 18(a)

A configuration in which the QT split of 4×4/8×8 is restricted, the BT split in a case of 4×2/2×4 is restricted in DUAL_TREE_CHROMA, and the TT split in a case of 8×2/2×8 is restricted in the chroma tree DUAL_TREE_CHROMA. This produces an effect of preventing processing delay caused by chroma intra prediction in a case that the chroma block is 2×2.

(Configuration B) FIG. 16, FIGS. 17(a) and 17(b), and FIGS. 18(a) and 18(c)

A configuration in which the QT split of 4×4/8×8 is restricted, the BT split in a case of 8×2/2×8/4×4 is restricted in DUAL_TREE_CHROMA, and the TT split in a case of 8×4/4×8/16×2/2×16 is restricted in the chroma tree DUAL_TREE_CHROMA. This produces an effect of preventing processing delay caused by chroma intra prediction in a case that the chroma block is 4×2/2×4.

Configuration of Intra Prediction Parameter Derivation Unit 304

The intra prediction parameter derivation unit 304 decodes the intra prediction parameter, for example, the intra prediction mode IntraPredMode, with reference to the prediction parameter stored in the prediction parameter memory 307, based on input from the entropy decoder 301 or the coding parameter determination unit 110. The intra prediction parameter derivation unit 304 outputs the decoded intra prediction parameter to the prediction image generation unit 308, and stores the decoded intra prediction parameter in the prediction parameter memory 307. The intra prediction parameter derivation unit 304 may derive different intra prediction modes between luma and chroma.

Figure 19:
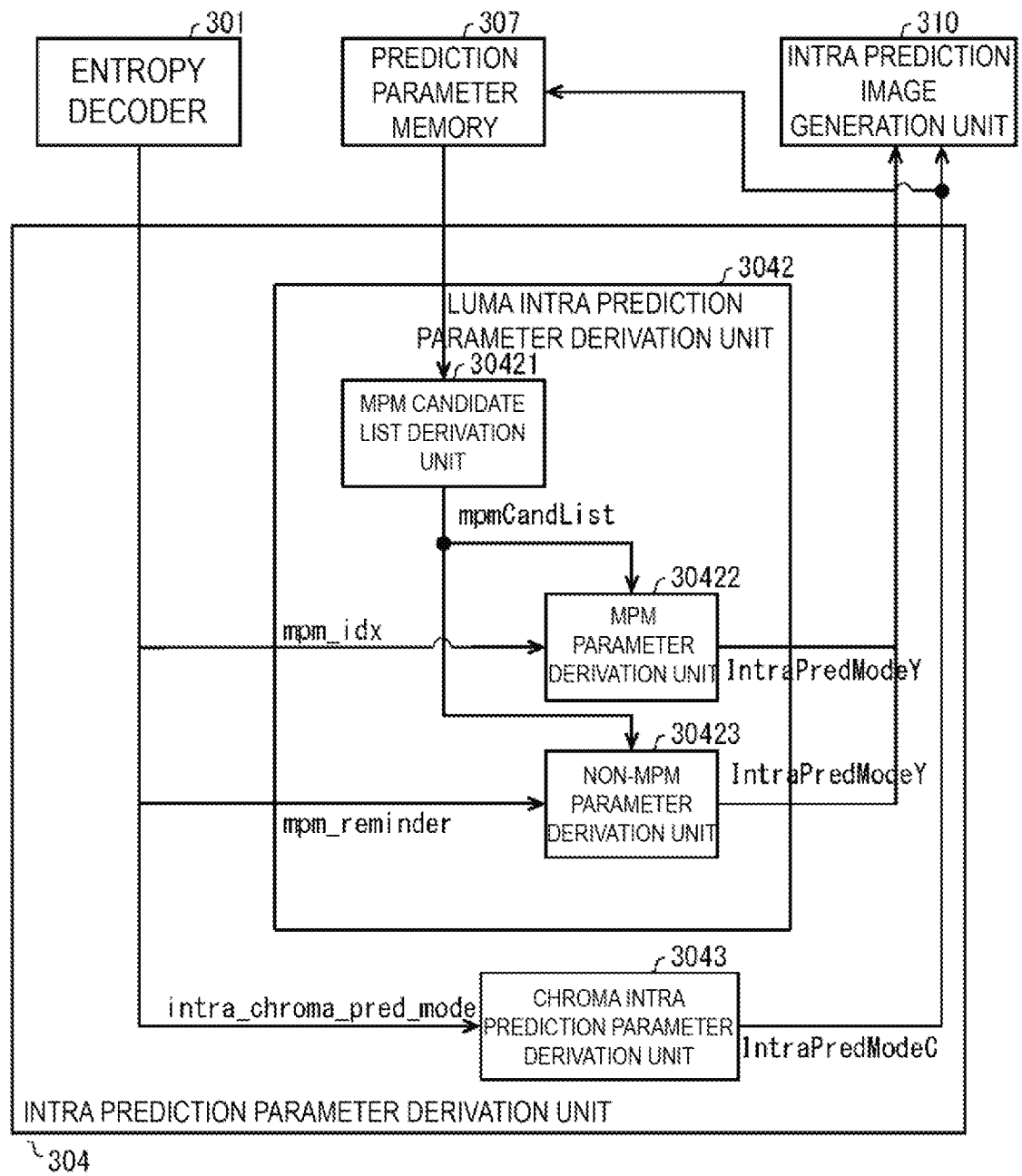
FIG. 19 is a schematic diagram illustrating a configuration of an intra prediction parameter derivation unit 304.

FIG. 19 is a schematic diagram illustrating a configuration of the intra prediction parameter derivation unit 304 of the parameter decoder 302. As illustrated in FIG. 19, the intra prediction parameter derivation unit 304 includes a luma intra prediction parameter derivation unit 3042 and a chroma intra prediction parameter derivation unit 3043.

The luma intra prediction parameter derivation unit 3042 includes an MPM candidate list derivation unit 30421, an MPM parameter derivation unit 30422, and a non-MPM parameter derivation unit 30423 (decoder, derivation unit).

The MPM parameter derivation unit 30422 derives the luma prediction mode IntraPredModeY with reference to the MPM candidate list mpmCandList[ ] derived by the MPM candidate list derivation unit 30421 and mpm_idx, and outputs the luma prediction mode IntraPredModeY to the intra prediction image generation unit 310.

The non-MPM parameter derivation unit 30423 derives RemIntraPredMode from the MPM candidate list mpmCandList[ ] and mpm_reminder, and outputs the luma prediction mode IntraPredModeY to the intra prediction image generation unit 310.

The chroma intra prediction parameter derivation unit 3043 derives the chroma prediction mode IntraPredModeC from the syntax element of the intra prediction parameter of chroma, and outputs the chroma prediction mode IntraPredModeC to the intra prediction image generation unit 310.

FIG. 20 is a diagram illustrating characteristics of the chroma intra prediction mode according to the present embodiment. The chroma intra prediction mode includes DC (0) in which an average value is derived and used, Planar prediction (1) in which a smooth prediction image is created from left and top left, top, top right, and bottom left pixel values, directional prediction (Angular prediction) in which derivation is performed from a reference pixel of a boundary pixel located at a position that is extended from a target pixel in a specific direction, and CCLM prediction. The directional prediction includes 65 directions of from 2 to 66, such as bottom left (2) to horizontal H (18), top left DIA (34), vertical V (50), and top right VDIA (66). The CCLM includes three modes (81, 82, and 83) as well.

As illustrated in FIG. 20, in order to generate a prediction image according to the chroma intra prediction mode, whether multiplication is required, whether parameter derivation is required, or which reference pixel is used differs. In the DC prediction, the multiplication is not required, but simple parameter derivation is required in order to derive an average value. For the average value, left and top parts of the target block are referred to. In the Planar prediction, multiplication is required, parameter derivation in a sense of pixel value derivation of the right edge and the bottom edge of the target block is required, and in addition, left, top left, top, top right, and bottom left parts are referred to. In Angular, processing differs depending on a direction. Regarding H, V, DIA, and VDIA, multiplication is not required, and derivation can be performed only with a copy of pixels. In H and V, only left and top parts of the target block are each referred to, whereas in DIA, not only the left and the top part but also an top left part is required to be referred to, and in VDIR, an top right image is required to be referred to. In other Angular modes, multiplication and reference to left, top, top left, top right, and bottom left images of the target block are required. In CCLM, both of multiplication and parameter derivation are required, and reference to luma samples and downsamples are required. In addition, reference to top left and top right images may be performed.

FIG. 21 is a diagram illustrating a relationship between the block size and the chroma intra prediction mode used in the video decoding apparatus and the video coding apparatus according to the present embodiment. FIG. 21(*b*) is the chroma intra mode used in a case of a prescribed block size or more. As illustrated in FIG. 21(*b*), in 2×2, only the DC prediction and restricted Angular prediction are used. In the restricted Angular prediction, multiplication is not used, and is H, V, DIA, and VDIA, and further may be only H and V in which the top left and top right of the target block are not used. In a case other than 2×2, other modes, for example, DC, Planar, Angular, and CCLM, may be used. Specifically, a mode with multiplication, parameter derivation, and reference to the top left and top right of the target block may be used. FIG. 21(*c*) illustrates a case that the chroma intra mode is restricted in 2×2/4×2/2×4. Note that, as will be described later, further restriction (for example, DC only, H or V only, DC, H, or V only) may be performed in a case of a prescribed size or less.

Basic Derivation Method

FIG. 22 is a diagram illustrating details of binalization of the chroma intra prediction mode syntax intra_chroma_pred_mode and chroma intra prediction mode IntraPredModeC derivation in a case that CCLM is off. In a case that CCLM is off, binalization (Bin String) of 1 bit (0) or 3 bits (100, 101, 110, 111) is decoded. intra_chroma_pred_mode of 0 to 4 is derived according to the decoded binalization. In addition, IntraPredModeC is derived from the luma intra prediction mode IntraPredModeY corresponding to decoded intra_chroma_pred_mode. For example, in a case that intra_chroma_pred_mode is 4 (DirectMode, DM), IntraPredModeC is set equal to a value of IntraPredModeY.

IntraPredModeC=IntraPredModeY

In a case that intra_chroma_pred_mode is 0 (Planar), IntraPredModeC is set equal to 0 (Planar). Note that, in a case that IntraPredModeY is Planar, VDIA is configured.

In a case that intra_chroma_pred_mode is 1 (V), IntraPredModeC is set equal to 50 (V). Note that, in a case that IntraPredModeY is V, VDIA is configured.

In a case that intra_chroma_pred_mode is 2 (H), IntraPredModeC is set equal to 18 (H). Note that, in a case that IntraPredModeY is H, VDIA is configured.

In a case that intra_chroma_pred_mode is 3 (DC), IntraPredModeC is set equal to 1 (DC). Note that, in a case that IntraPredModeY is DC, VDIA is configured.

FIG. 23 is a diagram illustrating details of binalization of the chroma intra prediction mode syntax intra_chroma_pred_mode and chroma intra prediction mode derivation in a case that CCLM is on. In a case that CCLM is on, binalization (Bin String) of 1 bit (0), 2 bits (10), 4 bits (1110, 1111), or 5 bits (11000, 11001, 11010, 11011) is decoded. intra_chroma_pred_mode of 0 to 7 is derived according to the decoded binalization. In addition, IntraPredModeC is derived from the luma intra prediction mode IntraPredModeY corresponding to decoded intra_chroma_pred_mode. For example, in a case that intra_chroma_pred_ mode is 7 (DirectMode, DM), a value of IntraPredModeC is set equal to IntraPredModeY.

IntraPredModeC=IntraPredModeY

A case that intra_chroma_pred_mode is 0, 1, 2, or 3 is already described with reference to FIG. 22, and thus description thereof is omitted.

In a case that intra_chroma_pred_mode is 4, IntraPredModeC is set equal to a value (81) indicating the first CCLM mode.

In a case that intra_chroma_pred_mode is 5, IntraPredModeC is set equal to a value (82) indicating the second CCLM mode (INTRA_L_CCLM).

In a case that intra_chroma_pred_mode is 6, IntraPredModeC is set equal to a value (83) indicating the third CCLM mode (INTRA_T_CCLM).

Configuration of 1-Bit Bin String

FIG. 24 is a diagram illustrating a relationship between the block size, the number of bits of intra_chroma_pred_mode, and the chroma intra prediction mode used in the video decoding apparatus and the video coding apparatus according to the present embodiment.

Figure 25:
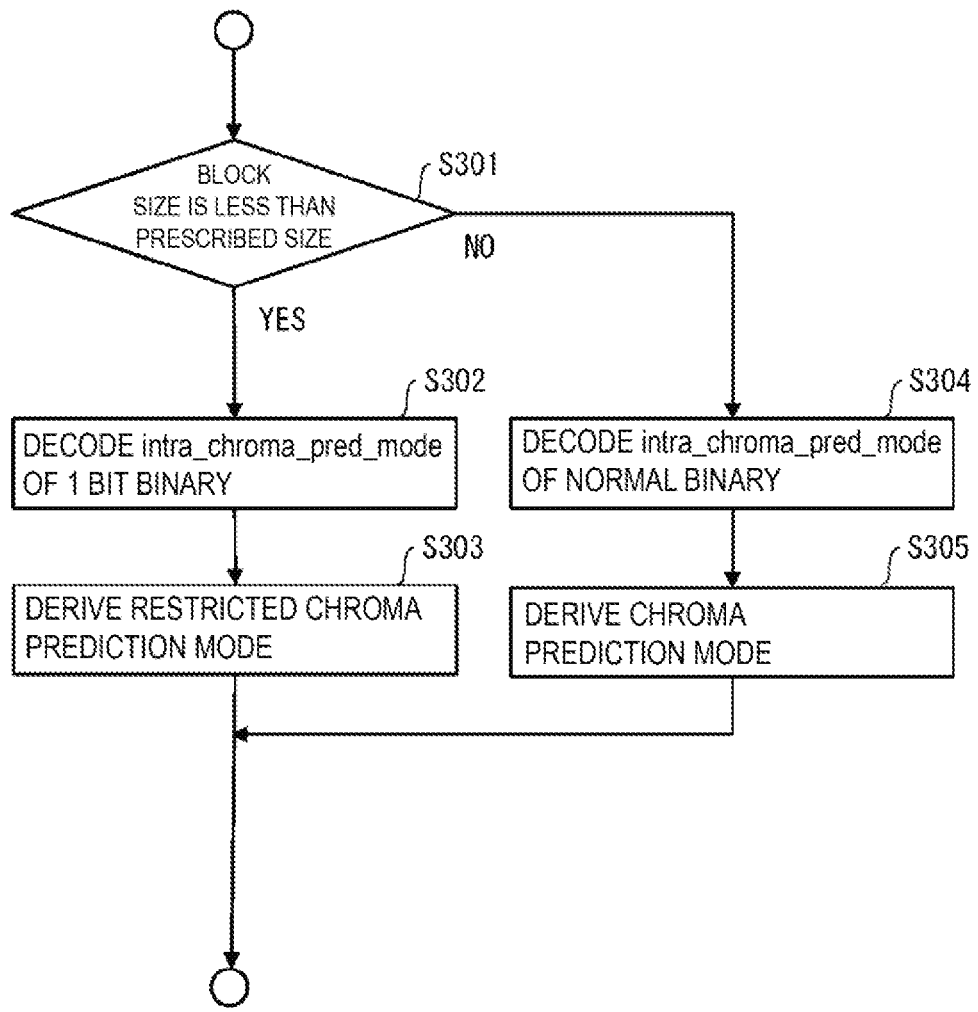
FIG. 25 is a flowchart illustrating processing of chroma intra prediction mode derivation according to the present embodiment.

FIG. 25 is a flowchart illustrating processing of chroma intra prediction mode derivation performed in the video decoding apparatus and the video coding apparatus according to the present embodiment.

S301 The parameter decoder 302 determines whether the chroma block size is less than a prescribed size. For example, in a case of distinguishing between 2×2 and other cases, determination may be made based on whether any of the width and the height is less than 4 (cbWidthC<4||cbHeightC<4). In a case of distinguishing between 2×2, 4×2, or 2×4 and other cases, determination may be made based on whether the sum of the width and the height is less than 8 (cbWidthC+cbHeightC<8). The chroma block size is determined by a sampling ratio between the luma block size and the color component, and thus the parameter decoder 302 may make determination by using the width cbWidth and the height cbHeight of the luma block and the sampling ratios SubWidthC and SubHeightC.

$$(cbWidthC/SubWidth < 4 ||_{cb}Height/SubHeight < 4)$$

$$(cbWidth_C/SubWidth + cbHeight/SubHeight < 8)$$

S302 In a case that the chroma block size is less than the prescribed size, the parameter decoder 302 decodes intra_chroma_pred_mode indicated by binalization of 1 bit. The chroma intra prediction parameter derivation unit 3043 derives the chroma intra prediction mode IntraPredModeC by using intra_chroma_pred_mode. For example, the parameter decoder 302 may switch the horizontal prediction H and the vertical prediction V, according to a value of intra_chroma_pred_mode.

$$IntraPredModeC = (intra\_chroma\_pred\_mode == 0) ? V:H$$

FIG. 26 is a diagram illustrating details of binalization of the intra_chroma_pred_mode and chroma intra prediction mode derivation according to the present embodiment. As illustrated in FIG. 26, intra_chroma_pred_mode takes binalization (in FIG. 26, Bin String) of 1 bit of 0 or 1, and the value of intra_chroma_pred_mode is 0 or 1. Here, as illustrated in FIG. 26, IntraPredModeC is set equal to the horizontal prediction H or the vertical prediction V according to the value of intra_chroma_pred_mode, regardless of the luma intra mode IntraPredModeY[xCb+cbWidth/2][yCb+cbHeight/2] at a corresponding position (xCb+cbWidth/2, yCb+cbHeight/2) (S303).

S304 In a case that the chroma block size is equal to or more than the prescribed size, the parameter decoder 302 decodes intra_chroma_pred_mode indicated by binalization of 1 bit to N bits.

S305 In a case that the chroma block size is equal to or more than the prescribed size, the chroma intra prediction parameter derivation unit 3043 derives the chroma prediction mode from decoded intra_chroma_pred_mode. For example, in a case of CCLM off, as has been described with reference to FIG. 22, binalization of 1 to 3 bits is decoded, and any one of the DC, Planar, and Angular modes is derived as IntraPredModeC. In a case of CCLM on, as has been described with reference to FIG. 23, binalization of 1 to 5 bits is decoded, and any one of the DC, Planar, Angular, and CCLM (INTRA_LT_CCLM, INTRA_L_CCLM, INTRA_T_CCLM) modes is derived as IntraPredModeC.

According to the above configuration, in a case that the chroma block size is small, the restricted chroma prediction mode not using multiplication or top left and top right parts of the target block is derived with decoding of 1 bit. This thus produces an effect of reducing processing delay of the chroma intra prediction which poses a problem in the intra prediction in particular, without deteriorating coding efficiency.

Configuration 1 of Syntax Omission

FIG. 27 is a diagram illustrating a relationship between the block size, the number of bits of intra_chroma_pred_mode, and the chroma intra prediction mode used in the video decoding apparatus and the video coding apparatus according to another aspect of the present embodiment.

Figure 28:
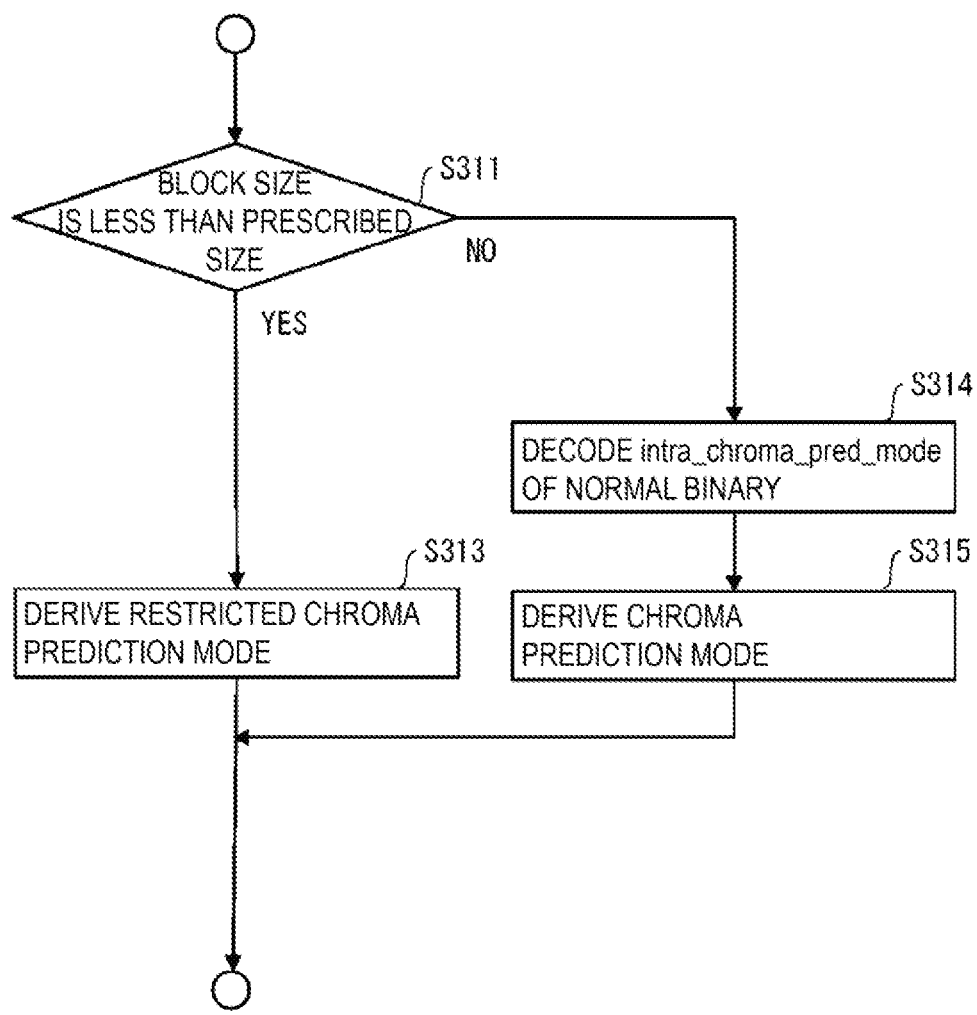
FIG. 28 is a flowchart illustrating processing of chroma intra prediction mode derivation according to another aspect of the present embodiment.

FIG. 28 is a flowchart illustrating processing of chroma intra prediction mode derivation performed in the video decoding apparatus and the video coding apparatus according to another aspect of the present embodiment.

S311 The parameter decoder 302 determines whether the chroma block size is less than a prescribed size.

S313 In a case that the chroma block size is less than the prescribed size, the parameter decoder 302 configures 0 without decoding intra_chroma_pred_mode. In a case that the chroma block size is less than the prescribed size, the chroma intra prediction parameter derivation unit 3043 derives the chroma intra prediction mode IntraPredModeC by using IntraPredModeY. For example, the parameter decoder 302 may perform derivation by using following expression.

$$IntraPredModeC = (IntraPredModeY < 2) ? DC : (IntraPredModeY < DIA) ? H:V$$

Figure 29:
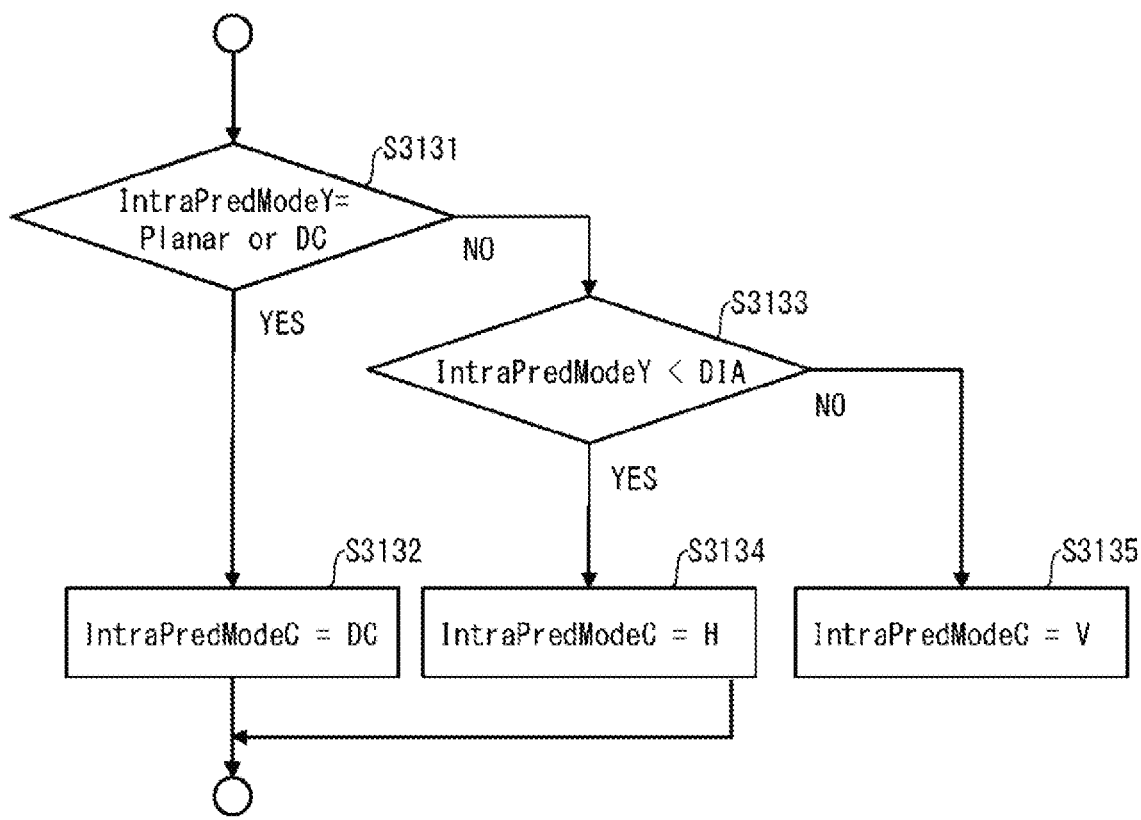
FIG. 29 is a flowchart illustrating operation of a chroma intra prediction parameter derivation unit 3043 in a case that a chroma block size is less than a prescribed size according to another aspect of the present embodiment.

FIG. 29 is a flowchart illustrating operation of the chroma intra prediction parameter derivation unit 3043 in a case that the chroma block size is less than a prescribed size.

S3131 In a case that IntraPredModeY is Planar or DC, the processing proceeds to S3132, otherwise the processing proceeds to S3133.

S3122 In a case that IntraPredModeY is Planar or DC, IntraPredModeC is set equal to DC.

S3133 In a case that IntraPredModeY is less than DIA, the processing proceeds to S3134, otherwise the processing proceeds to S3135.

S3134 In a case that IntraPredModeY is less than DIA, IntraPredModeC is set equal to H.

S3135 In a case that IntraPredModeY is equal to or more than DIA, IntraPredModeC is set equal to V.

Note that, in a case that IntraPredModeY is equal to or less than DIA as below, IntraPredModeC may be set equal to H.

$$IntraPredModeC = (IntraPredModeY <= 1) ? DC : (IntraPredModeY <= DIA) ? H:V$$

FIG. 30 is a diagram illustrating details of binalization of intra_chroma_pred_mode and chroma intra prediction mode derivation according to another aspect of the present embodiment. As illustrated in FIG. 30, intra_chroma_pred_mode is not coded or decoded, and thus there is no binalization (Bin String). Derivation from IntraPredModeY to IntraPredModeC is close to a direct mode (DM). The Planar mode is converted into the DC mode, the Angular mode less than the top left (DIA) is converted into horizontal H, and others into vertical. FIG. 30 illustrates the following derivation method of IntraPredModeC.

In a case that IntraPredModeY is Planar, DC is configured.

In a case that IntraPredModeY is V, V is configured.
In a case that IntraPredModeY is H, H is configured.
In a case that IntraPredModeY is DC, DC is configured.

In a case that IntraPredModeY is X (0<=X<=66), H is configured in a case of less than DIA and V is configured in a case of equal to or more than DIA.

S314 In a case that chroma block size is equal to or more than the prescribed size, the parameter decoder 302 decodes intra_chroma_pred_mode indicated by binalization of 1 bit to N bits.

S315 In a case that the chroma block size is equal to or more than the prescribed size, the chroma intra prediction parameter derivation unit 3043 derives the chroma prediction mode from decoded intra_chroma_pred_mode. This operation is as has been described in S305, and thus description thereof is omitted.

According to the above configuration, in a case that the chroma block size is small, the restricted chroma prediction mode not using multiplication or top left and top right parts of the target block is derived without decoding the syntax indicating the chroma intra mode. This thus produces an effect of reducing processing delay of the chroma intra prediction which poses a problem in the intra prediction in particular, without deteriorating coding efficiency. Because the chroma intra mode is not decoded, processing delay of CABAC can further be reduced.

Configuration 2 of Syntax Omission

In a case that the chroma block size is small, another example of the example of using the restriction mode with omission of coding and decoding of intra_chroma_pred_mode will be described.

S313 of FIG. 28 is replaced with S313' described below.

S313 In a case that the chroma block size is less than the prescribed size, the parameter decoder 302 derives 0 without decoding intra_chroma_pred_mode. In a case that the chroma block size is less than the prescribed size, the chroma intra prediction parameter derivation unit 3043 derives the chroma intra prediction mode by using the DC mode. For example, the parameter decoder 302 may perform derivation by using following expression.

$$IntraPredModeC=DC$$

FIG. 31 is a diagram illustrating details of binalization of intra_chroma_pred_mode and chroma intra prediction mode derivation according to another aspect of the present embodiment. As illustrated in FIG. 31, intra_chroma_pred_mode is not coded or decoded, and thus there is no binalization (Bin String). For IntraPredModeC, the DC mode is configured regardless of IntraPredModeY.

In a case that IntraPredModeY is V, DC is configured.
In a case that IntraPredModeY is H, DC is configured.
In a case that IntraPredModeY is DC, DC is configured.
In a case that IntraPredModeY is X (0<=X<=66), DC is configured.

According to the above configuration, in a case that the chroma block size is small, the chroma prediction mode fixed to the DC is derived without decoding the syntax of the chroma intra mode. This thus produces an effect of reducing processing delay of the chroma intra prediction which poses a problem in the intra prediction in particular, without deteriorating coding efficiency. Because the chroma intra mode is not decoded, processing delay of the chroma intra prediction can further be reduced.

CCLM Prediction

The CCLM prediction unit 31044 derives a CCLM prediction parameter by using a luma neighboring image pRefY[ ][ ] and a chroma neighboring image pRefC[ ][ ] as reference regions. The CCLM prediction unit 31044 derives a prediction image of chroma by using a luma target image pRef[ ].

In a case that intra_chroma_pred_mode is 81 (INTRA_LT_CCLM), the CCLM prediction unit 31044 derives the CCLM prediction parameter by using pixel values of top and left neighboring blocks of the target block, in a case that intra_chroma_pred_mode is 82 (INTRA_L_CCLM), the CCLM prediction unit 31044 derives the CCLM prediction parameter by using pixel values of a left neighboring block, and in a case that intra_chroma_pred_mode is 83 (INTRA_T_CCLM), the CCLM prediction unit 31044 derives the CCLM prediction parameter by using pixel values of an top neighboring block.

The CCLM prediction unit downsamples pRefY[ ][ ] and pY[ ][ ] so as to cause matching with the size of the chroma image. In a case that a chroma format is 4:2:0, the number of pixels in the horizontal and vertical directions of pRefY[ ][ ] and pY[ ][ ] is sampled to 2:1, and results are stored in pRefDsY[ ][ ] and pDsY[ ][ ] of FIG. 13(d). Note that bW/2 and bH/2 are equal to bWC and bHC, respectively. In a case that the chroma format is 4:2:2, the number of pixels in the horizontal direction of pRefY[ ][ ] and pY[ ][ ] is sampled to 2:1, and results are stored in pRefDsY[ ][ ] and pDsY[ ][ ]. In a case that the chroma format is 4:4:4, sampling is not performed, and pRefY[ ][ ] and pY[ ][ ] are stored in pRefDsY[ ][ ] and pDsY[ ][ ]. An example of the sampling is represented as in the following expressions.

$$pDsY[x][y]=(pY[2*x-1][2*y]+pY[2*x-1][2*y+1]+2*pY[2*x][2*y]+2*pY[2*x][2*y+1]+pY[2*x+1][2*y]+pY[2*x+1][2*y+1]+4)>>3$$

$$pRefDsY[x][y]=(pRefY[2*x-1][2*y]+pRefY[2*x-1][2*y+1]+2*pRefY[2*x][2*y]+2*pRefY[2*x][2*y+1]+pRefY[2*x+1][2*y]+pRefY[2*x+1][2*y+1]+4)>>3$$

The CCLM prediction unit derives a minimum value MinLuma and a maximum value MaxLuma of a neighboring luma image pDsY and chroma pixel values ChromaForMinLuma and ChromaForMaxLuma on the chroma image pRefC at the position.

The CCLM prediction unit derives inclination a by dividing a difference between ChromaForMinLuma and ChromaForMaxLuma by a difference between MinLuma and MaxLuma. More specifically, for integer arithmetic, a CCLM parameter a is derived according to the following expressions.

$$shift=(BitDepthC>8)?BitDepthC-9:0$$

$$add=shift?1<<(shift-1):0$$

$$diff=(MaxLuma-MinLuma+add)>>shift$$

$$k=16$$

In a case that diff is positive, the CCLM prediction unit derives a by using the following expression, otherwise a=0.

$$a=(((ChromaForMaxLuma-ChromaForMinLuma)*Floor(65536/diff)+add)>>shift)$$

In addition, the CCLM prediction unit derives b.

$$b=ChromaForMinLuma-((a*MinLuma)>>k)$$

The CCLM prediction unit uses a reference image refSamples[ ][ ] as an input signal, and outputs a prediction image predSamples[ ][ ] by using the CCLM prediction parameters (a, b).

$$predSamples[\ ][\ ]=((a*refSamples[\ ][\ ])>>shiftA)+b$$

As described above, in the CCLM prediction, derivation of parameters and multiplication for generation of a prediction image are required.

The loop filter 305 is a filter provided in a coding loop, and is a filter that removes block distortion and ringing distortion so as to improve image quality. The loop filter 305 applies a filter such as a deblocking filter, a sample adaptive offset (SAO), and an adaptive loop filter (ALF) on a decoded image of the CU generated by the addition unit 312.

The reference picture memory 306 stores a decoded image of the CU generated by the addition unit 312 at a position predetermined for each target picture and target CU.

The prediction parameter memory 307 stores the prediction parameter at the position predetermined for each CTU or CU to be decoded. Specifically, the prediction parameter memory 307 stores the parameters decoded by the parameter decoder 302, the prediction mode predMode decoded by the entropy decoder 301, and the like.

To the prediction image generation unit 308, the prediction mode predMode, the prediction parameter, and the like are input. The prediction image generation unit 308 reads a reference picture from the reference picture memory 306. The prediction image generation unit 308 generates a prediction image of a block or a subblock by using the prediction parameter and the read reference picture (reference picture block) in the prediction mode indicated by the prediction mode predMode. Here, the reference picture block is a set of pixels (referred to as a block because the reference picture block usually have a rectangular shape) on a reference picture and is a region that is referred to in order to generate a prediction image.

Inter Prediction Image Generation Unit 309

In a case that the prediction mode predMode indicates the inter prediction mode, the inter prediction image generation unit 309 generates a prediction image of a block or a subblock using the inter prediction, by using the inter prediction parameter input from the inter prediction parameter derivation unit 303 and the read reference picture.

The inter prediction image generation unit 309 outputs the generated prediction image of the block to the addition unit 312.

The inverse quantization and inverse transform processing unit 311 performs inverse quantization on the quantization transform coefficient input from the entropy decoder 301, and obtains a transform coefficient. The quantization transform coefficient is a coefficient that is obtained by performing frequency transform such as Discrete Cosine Transform (DCT) and Discrete Sine Transform (DST) and quantization on a prediction error in coding processing. The inverse quantization and inverse transform processing unit 311 performs inverse frequency transform such as inverse DCT and inverse DST on the obtained transform coefficient, and calculates the prediction error. The inverse quantization and inverse transform processing unit 311 outputs the prediction error to the addition unit 312.

The addition unit 312 adds up the prediction image of the block input from the prediction image generation unit 308 and the prediction error input from the inverse quantization and inverse transform processing unit 311 for each pixel, and generates a decoded image of the block. The addition unit 312 stores the decoded image of the block in the reference picture memory 306, and further, outputs the decoded image to the loop filter 305.

Configuration of Video Coding Apparatus

Figure 32:
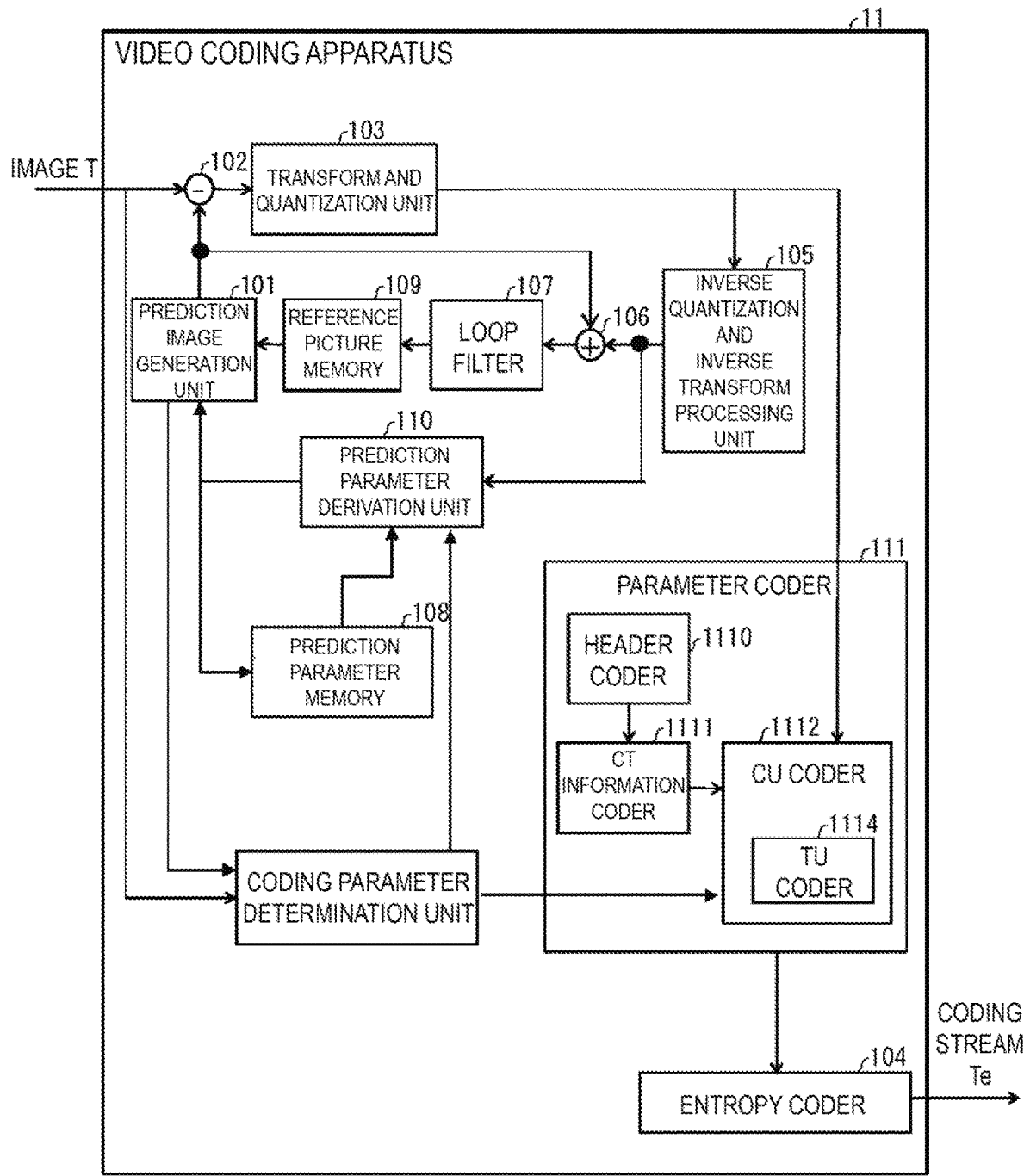
FIG. 32 is a block diagram illustrating a configuration of a video coding apparatus.

Next, a configuration of the video coding apparatus 11 according to the present embodiment will be described. FIG. 32 is a block diagram illustrating a configuration of the video coding apparatus 11 according to the present embodiment. The video coding apparatus 11 includes a prediction image generation unit 101, a subtraction unit 102, a transform and quantization unit 103, an inverse quantization and inverse transform processing unit 105, an addition unit 106, a loop filter 107, a prediction parameter memory (a prediction parameter storage unit, a frame memory) 108, a reference picture memory (a reference image storage unit, a frame memory) 109, a coding parameter determination unit 110, a prediction parameter derivation unit 120, and an entropy coder 104.

The prediction image generation unit 101 generates a prediction image for each CU being a region obtained by splitting each picture of the image T. The prediction image generation unit 101 performs the same operation as the operation of the prediction image generation unit 308 described in the above, and thus description thereof is omitted.

The subtraction unit 102 subtracts a pixel value of the prediction image of the block input from the prediction image generation unit 101 from a pixel value of the image T to generate a prediction error. The subtraction unit 102 outputs the prediction error to the transform and quantization unit 103.

The transform and quantization unit 103 performs a frequency transform on the prediction error input from the subtraction unit 102 to calculate a transform coefficient, and derives a quantization transform coefficient through quantization. The transform and quantization unit 103 outputs the quantization transform coefficient to the entropy coder 104 and the inverse quantization and inverse transform processing unit 105.

The inverse quantization and inverse transform processing unit 105 is the same as the inverse quantization and inverse transform processing unit 311 (FIG. 7) of the video decoding apparatus 31, and thus description thereof will be omitted. The calculated prediction error is output to the addition unit 106.

To the entropy coder 104, the quantization transform coefficient is input from the transform and quantization unit 103, and the coding parameter is input from the coding parameter determination unit 110. The coding parameter includes, for example, codes such as the reference picture index refIdxLX, the prediction vector index mvp_LX_idx, the difference vector mvdLX, the prediction mode predMode, and the merge index merge_idx.

The entropy coder 104 performs entropy coding on the split information, the prediction parameter, the quantization transform coefficient, and the like, and generates and outputs the coding stream Te.

The prediction parameter derivation unit 120 is a means including an inter prediction parameter derivation unit 303 and an intra prediction parameter derivation unit 304, and derives an intra prediction parameter from the coding parameters input from the coding parameter determination unit 110 and the intra prediction parameter. The derived intra prediction parameter and intra prediction parameter are output to the prediction image generation unit 101 and the prediction parameter memory 108. The parameter coder 111 includes a header coder 1110, a CT information coder 1111, and a CU coder 1112 (prediction mode coder), and an inter prediction parameter coder 112 and an intra prediction parameter coder 113 (not illustrated). The CU coder 1112 further includes a TU coder 1114. The coding parameter determination unit 110 includes an inter prediction parameter coder 112 and an intra prediction parameter coder 113.

General operation of each module will be described below. The prediction parameter derivation unit 120 performs coding processing of parameters such as header information, split information, prediction information, and quantization transform coefficients.

The CT information coder 1111 codes the QT and MT (BT, TT) split information and the like.

the CU coder 1112 codes the CU information, the prediction information, the TU split flag split_transform_flag, the CU residual flags cbf_cb, cbf_cr, and cbf_luma, and the like.

In a case that a prediction error is included in the TU, the TU coder 1114 codes the QP update information (quantization correction value) and the quantization prediction error (residual_coding).

The CT information coder 1111 and the CU coder 1112 supplies, to the entropy coder 104, syntax elements such as the inter prediction parameter (the prediction mode predMode, the merge flag merge_flag, the merge index merge_idx, the inter prediction indicator inter_pred_idc, the reference picture index refIdxLX, the prediction vector index mvp_LX_idx, the difference vector mvdLX), the intra prediction parameter (the intra_luma_mpm_flag, the mpm_idx, mpm_reminder, the intra_chroma_pred_mode), and the quantization transform coefficient.

The coding parameter determination unit 110 selects one set among multiple sets of coding parameters. A coding parameter refers to the above-mentioned QT, BT, or TT split information, prediction parameters, or parameters to be coded that are generated in association with these. The prediction parameter derivation unit 120 derives the prediction parameters from the parameter determined by the coding parameter determination unit 110, and outputs the prediction parameters to the prediction image generation unit 101. The prediction image generation unit 101 generates a prediction image by using these prediction parameters.

The coding parameter determination unit 110 calculates, for each of the multiple sets, an RD cost value indicating the magnitude of an amount of information and a coding error. The RD cost value is, for example, the sum of a code amount and the value obtained by multiplying a coefficient $\lambda$ by a square error. The code amount is an amount of information of the coding stream Te obtained by performing entropy coding on a quantization error and a coding parameter. The square error is the sum of prediction errors calculated in the subtraction unit 102. The coefficient $\lambda$ is a real number greater than a preconfigured zero. The coding parameter determination unit 110 selects a set of coding parameters of which cost value calculated is a minimum value. In this manner, the entropy coder 104 outputs a set of selected coding parameters as the coding stream Te. The prediction parameters derived by the prediction parameter derivation unit 303 are stored in the prediction parameter memory 108.

Configuration of Inter Prediction Parameter Coder

The inter prediction parameter coder 112 includes a merge index derivation unit 11211 and a vector candidate index derivation unit 11212.

The merge index derivation unit 11211 derives the merge index merge_idx candidates, and outputs the merge index merge_idx candidates to a merge prediction parameter derivation unit 3036 (merge prediction unit) of the prediction parameter derivation unit 120. The vector candidate index derivation unit 11212 derives the prediction vector index mvp_LX_idx candidates. The merge prediction parameter derivation unit 3036 derives the inter prediction parameter, based on the merge index merge_idx, and outputs the inter prediction parameter to the prediction image generation unit 101.

An AMVP prediction parameter derivation unit 3032 derives the prediction vector mvpLX, based on the motion vector mvLX. The AMVP prediction parameter derivation unit 3032 outputs the prediction vector mvpLX to an MV subtraction unit 1123. Note that the reference picture index refIdxLX and the prediction vector index mvp_LX_idx are output to the parameter coder 111.

The MV subtraction unit 1123 subtracts the prediction vector mvpLX being output of the AMVP prediction parameter derivation unit 3032 from the motion vector mvLX input from the coding parameter determination unit 110, and generates the difference vector mvdLX. The difference vector mvdLX is output to the parameter coder 111.

The addition unit 106 adds up the pixel value of the prediction image of the block input from the prediction image generation unit 101 and the prediction error input from the inverse quantization and inverse transform processing unit 105 for each pixel, and generates a decoded image. The addition unit 106 stores the generated decoded image in the reference picture memory 109.

The loop filter 107 applies the deblocking filter, the SAO, and the ALF to the decoded image generated by the addition unit 106. Note that the loop filter 107 need not necessarily include the three types of the filters described above, and may include, for example, only the deblocking filter.

The prediction parameter memory 108 stores the prediction parameter generated by the coding parameter determination unit 110 at a position predetermined for each target picture and CU.

The reference picture memory 109 stores the decoded image generated by the loop filter 107 at a position predetermined for each target picture and CU.

Note that some of the video coding apparatus 11 and the video decoding apparatus 31 in the above-described embodiments, for example, the entropy decoder 301, the parameter decoder 302, the loop filter 305, the prediction image generation unit 308, the inverse quantization and inverse transform processing unit 311, the addition unit 312, the prediction image generation unit 101, the subtraction unit 102, the transform and quantization unit 103, the entropy coder 104, the inverse quantization and inverse transform processing unit 105, the loop filter 107, the coding parameter determination unit 110, and the prediction parameter derivation unit 120, may be realized by a computer. In that case, this configuration may be realized by recording a program for realizing such control functions on a computer-readable recording medium and causing a computer system to read the program recorded on the recording medium for execution. Note that the "computer system" mentioned here refers to a computer system built into either the video coding apparatus 11 or the video decoding apparatus 31 and is assumed to include an OS and hardware components such as a peripheral apparatus. Furthermore, a "computer-readable recording medium" refers to a portable medium such as a flexible disk, a magneto-optical disk, a ROM, a CD-ROM, and the like, and a storage device such as a hard disk built into the computer system. Moreover, the "computer-readable recording medium" may include a medium that dynamically retains a program for a short period of time, such as a communication line in a case that the program is transmitted over a network such as the Internet or over a communication line such as a telephone line, and may also include a medium that retains the program for a fixed period of time, such as a volatile memory included in the computer system functioning as a server or a client in such a case. Furthermore, the above-described program may be one for realizing some of the above-described functions, and also may be one capable of realizing the above-described functions in combination with a program already recorded in a computer system.

Further, a part or all of the video coding apparatus 11 and the video decoding apparatus 31 in the embodiments described above may be realized as an integrated circuit such as a Large Scale Integration (LSI). Each function block of the video coding apparatus 11 and the video decoding apparatus 31 may be individually realized as processors, or part or all may be integrated into processors. The circuit integration technique is not restricted to LSI, and the integrated circuits for the functional blocks may be realized as dedicated circuits or a multi-purpose processor. In a case that with advances in semiconductor technology, a circuit integration technology with which an LSI is replaced appears, an integrated circuit based on the technology may be used.

The embodiment of the present invention has been described in detail above referring to the drawings, but the specific configuration is not restricted to the above embodiments and various amendments can be made to a design that fall within the scope that does not depart from the gist of the present invention.

APPLICATION EXAMPLES

The above-mentioned video coding apparatus 11 and the video decoding apparatus 31 can be utilized being installed to various apparatuses performing transmission, reception, recording, and regeneration of videos. Note that the video may be a natural video imaged by a camera or the like, or may be an artificial video (including CG and GUI) generated by a computer or the like.

Figure 2:
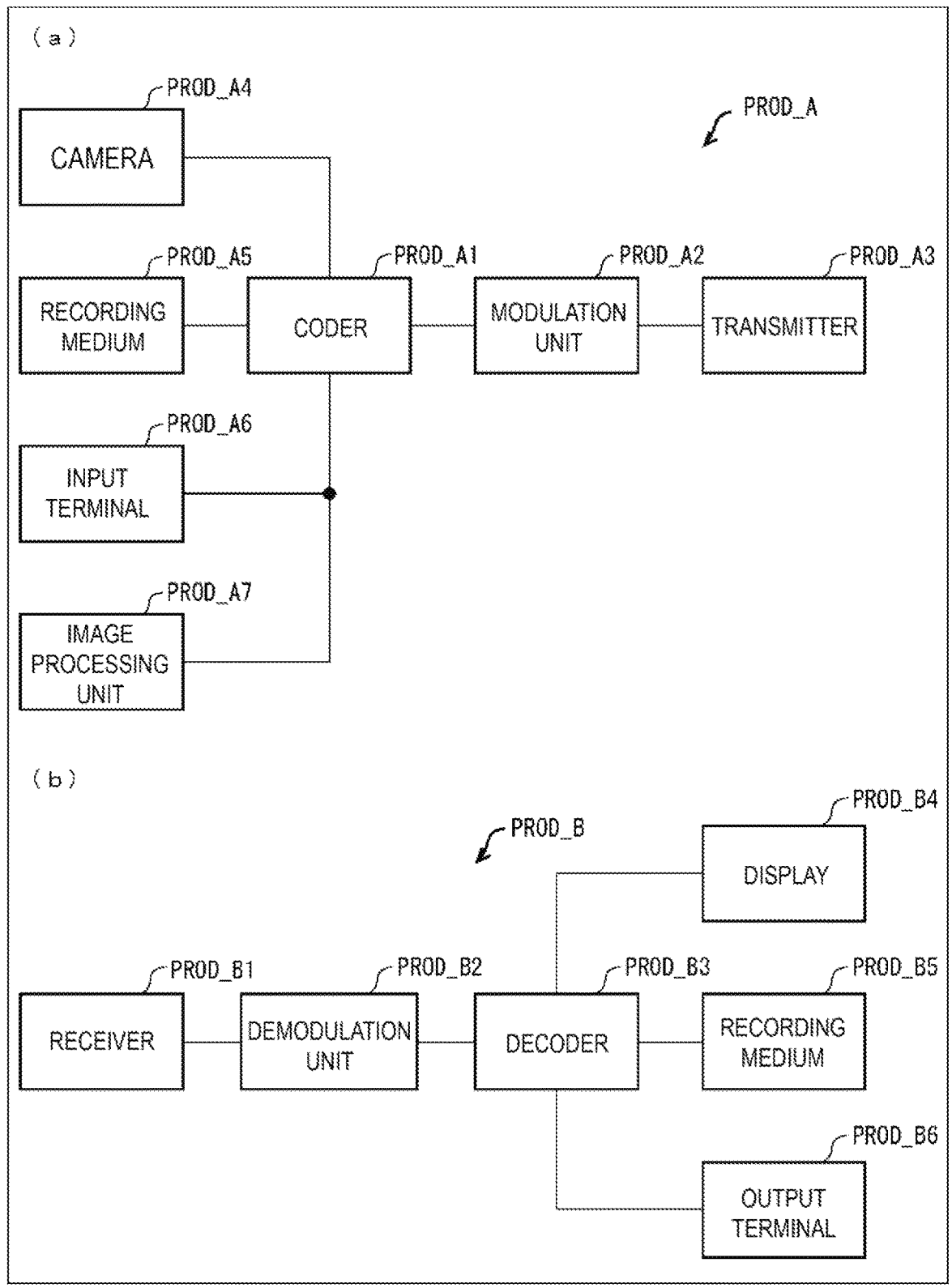
FIG. 2 is a diagram illustrating configurations of a transmitting apparatus equipped with a video coding apparatus and a receiving apparatus equipped with the video decoding apparatus according to the present embodiment. (a) thereof illustrates the transmitting apparatus equipped with the video coding apparatus, and (b) thereof illustrates the receiving apparatus equipped with the video decoding apparatus.

At first, referring to FIG. 2, it will be described that the above-mentioned video coding apparatus 11 and the video decoding apparatus 31 can be utilized for transmission and reception of videos.

FIG. 2(a) is a block diagram illustrating a configuration of a transmitting apparatus PROD_A installed with the video coding apparatus 11. As illustrated in FIG. 2(a), the transmitting apparatus PROD_A includes an coder PROD_A1 which obtains coded data by coding videos, a modulation unit PROD_A2 which obtains modulation signals by modulating carrier waves with the coded data obtained by the coder PROD_A1, and a transmitter PROD_A3 which transmits the modulation signals obtained by the modulation unit PROD_A2. The above-mentioned video coding apparatus 11 is utilized as the coder PROD_A1.

The transmitting apparatus PROD_A may further include a camera PROD_A4 that images videos, a recording medium PROD_A5 that records videos, an input terminal PROD_A6 for inputting videos from the outside, and an image processing unit A7 which generates or processes images, as supply sources of videos to be input into the coder PROD_A1. Although an example configuration in which the transmitting apparatus PROD_A includes all of the constituents is illustrated in FIG. 2(a), some of the constituents may be omitted.

Note that the recording medium PROD_A5 may record videos which are not coded or may record videos coded in a coding scheme for recording different from a coding scheme for transmission. In the latter case, a decoder (not illustrated) to decode coded data read from the recording medium PROD_A5 according to the coding scheme for recording may be present between the recording medium PROD_A5 and the coder PROD_A1.

FIG. 2(b) is a block diagram illustrating a configuration of a receiving apparatus PROD_B installed with the video decoding apparatus 31. As illustrated in FIG. 2(b), the receiving apparatus PROD_B includes a receiver PROD_B1 that receives modulation signals, a demodulation unit PROD_B2 that obtains coded data by demodulating the modulation signals received by the receiver PROD_B1, and a decoder PROD_B3 that obtains videos by decoding the coded data obtained by the demodulation unit PROD_B2. The above-mentioned video decoding apparatus 31 is utilized as the decoder PROD_B3.

The receiving apparatus PROD_B may further include a display PROD_B4 that displays videos, a recording medium PROD_B5 for recording the videos, and an output terminal PROD_B6 for outputting the videos to the outside, as supply destinations of the videos to be output by the decoder PROD_B3. Although an example configuration that the receiving apparatus PROD_B includes all of the constituents is illustrated in FIG. 2(b), some of the constituents may be omitted.

Note that the recording medium PROD_B5 may record videos which are not coded, or may record videos which are coded in a coding scheme for recording different from a coding scheme for transmission. In the latter case, an coder (not illustrated) that codes videos acquired from the decoder PROD_B3 according to the coding scheme for recording may be present between the decoder PROD_B3 and the recording medium PROD_B5.

Note that a transmission medium for transmitting the modulation signals may be a wireless medium or may be a wired medium. A transmission mode in which the modulation signals are transmitted may be a broadcast (here, which indicates a transmission mode in which a transmission destination is not specified in advance) or may be a communication (here, which indicates a transmission mode in which a transmission destination is specified in advance). That is, the transmission of the modulation signals may be realized by any of a wireless broadcast, a wired broadcast, a wireless communication, and a wired communication.

For example, a broadcasting station (e.g., broadcasting equipment)/receiving station (e.g., television receiver) for digital terrestrial broadcasting is an example of the transmitting apparatus PROD_A/receiving apparatus PROD_B for transmitting and/or receiving the modulation signals in the wireless broadcast. A broadcasting station (e.g., broadcasting equipment)/receiving station (e.g., television receivers) for cable television broadcasting is an example of the transmitting apparatus PROD_A/receiving apparatus PROD_B for transmitting and/or receiving the modulation signals in the wired broadcast.

A server (e.g., workstation)/client (e.g., television receiver, personal computer, smartphone) for Video On Demand (VOD) services, video hosting services and the like using the Internet is an example of the transmitting apparatus PROD_A/receiving apparatus PROD_B for transmitting and/or receiving the modulation signals in communication (usually, any of a wireless medium or a wired medium is used as a transmission medium in LAN, and the wired medium is used as a transmission medium in WAN). Here, personal computers include a desktop PC, a laptop PC, and a tablet PC. In addition, smartphones also include a multi-functional mobile telephone terminal.

Note that a client of a video hosting service has a function of coding a video imaged with a camera and uploading the video to a server, in addition to a function of decoding coded data downloaded from a server and displaying on a display. Thus, the client of the video hosting service functions as both the transmitting apparatus PROD_A and the receiving apparatus PROD_B.

Figure 3:
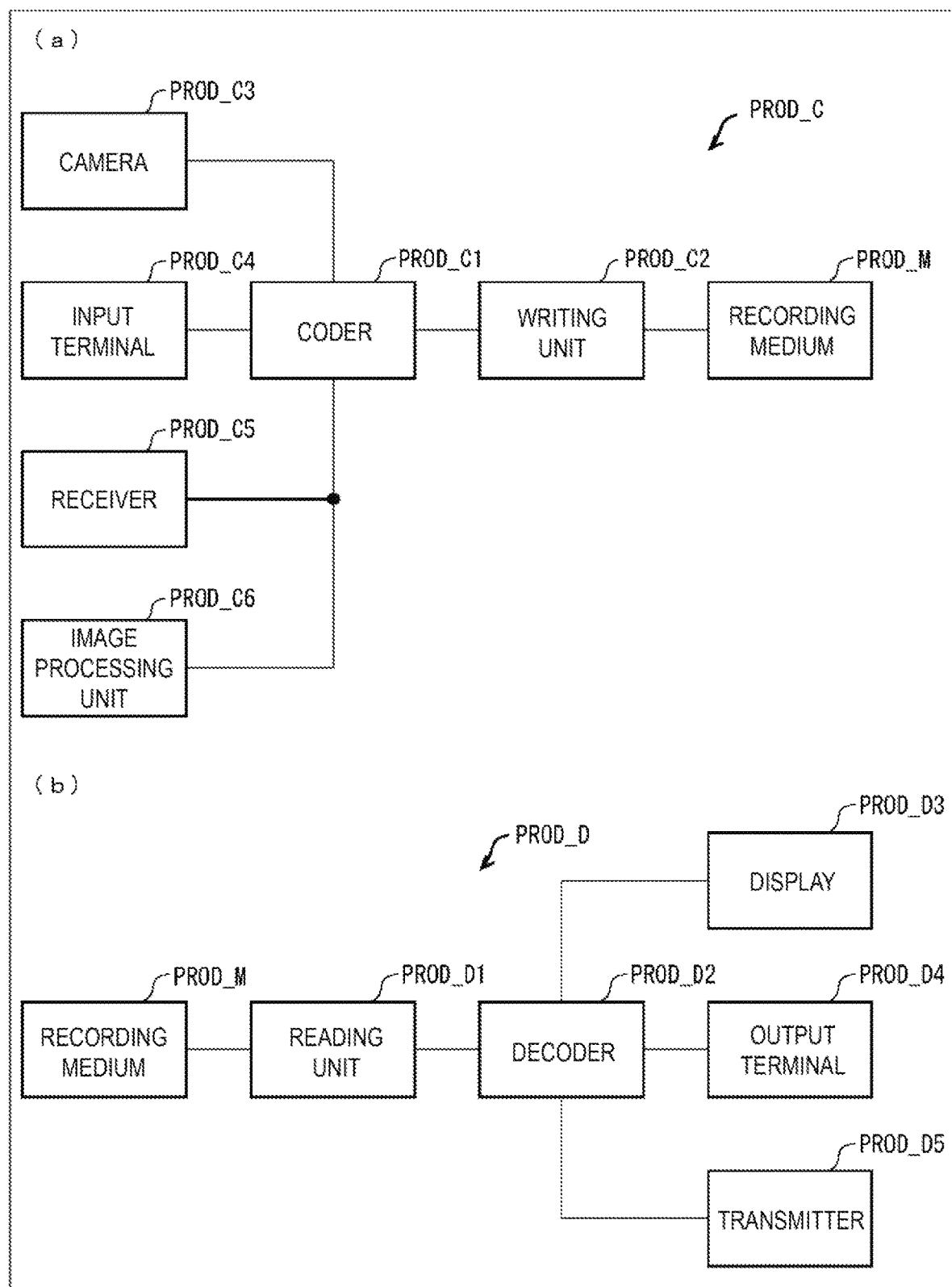
FIG. 3 is a diagram illustrating configurations of a recording apparatus equipped with the video coding apparatus and a reconstruction apparatus equipped with the video decoding apparatus according to the present embodiment. (a) thereof illustrates the recording apparatus equipped with the video coding apparatus, and (b) thereof illustrates the reconstruction apparatus equipped with the video decoding apparatus.

Next, referring to FIG. 3, it will be described that the above-mentioned video coding apparatus 11 and the video decoding apparatus 31 can be utilized for recording and regeneration of videos.

FIG. 3(a) is a block diagram illustrating a configuration of a recording apparatus PROD_C installed with the above-mentioned video coding apparatus 11. As illustrated in FIG. 3(a), the recording apparatus PROD_C includes an coder PROD_C1 that obtains coded data by coding a video, and a writing unit PROD_C2 that writes the coded data obtained by the coder PROD_C1 in a recording medium PROD M. The above-mentioned video coding apparatus 11 is utilized as the coder PROD_C1.

Note that the recording medium PROD_M may be (1) a type of recording medium built in the recording apparatus PROD_C such as Hard Disk Drive (HDD) or Solid State Drive (SSD), may be (2) a type of recording medium connected to the recording apparatus PROD_C such as an SD memory card or a Universal Serial Bus (USB) flash memory, and may be (3) a type of recording medium loaded in a drive apparatus (not illustrated) built in the recording apparatus PROD_C such as Digital Versatile Disc (DVD: trade name) or Blu-ray Disc (BD: trade name).

In addition, the recording apparatus PROD_C may further include a camera PROD_C3 that images a video, an input terminal PROD_C4 for inputting the video from the outside, a receiver PROD_C5 for receiving the video, and an image processing unit PROD_C6 that generates or processes images, as supply sources of the video input into the coder PROD_C1. Although an example configuration that the recording apparatus PROD_C includes all of the constituents is illustrated in FIG. 3(a), some of the constituents may be omitted.

Note that the receiver PROD_C5 may receive a video which is not coded, or may receive coded data coded in a coding scheme for transmission different from the coding scheme for recording. In the latter case, a decoder for transmission (not illustrated) that decodes coded data coded in the coding scheme for transmission may be present between the receiver PROD_C5 and the coder PROD_C1.

Examples of such recording apparatus PROD_C include, for example, a DVD recorder, a BD recorder, a Hard Disk Drive (HDD) recorder, and the like (in this case, the input terminal PROD_C4 or the receiver PROD_C5 is the main supply source of videos). A camcorder (in this case, the camera PROD_C3 is the main supply source of videos), a personal computer (in this case, the receiver PROD_C5 or the image processing unit C6 is the main supply source of videos), a smartphone (in this case, the camera PROD_C3 or the receiver PROD_C5 is the main supply source of videos), or the like is an example of the recording apparatus PROD_C as well.

FIG. 3(b) is a block illustrating a configuration of a regeneration apparatus PROD_D installed with the above-mentioned video decoding apparatus 31. As illustrated in FIG. 3(b), the reconstruction apparatus PROD_D includes a reading unit PROD_D1 which reads coded data written in the recording medium PROD M, and a decoder PROD_D2 which obtains a video by decoding the coded data read by the reader PROD_D1. The above-mentioned video decoding apparatus 31 is utilized as the decoder PROD_D2.

Note that the recording medium PROD_M may be (1) a type of recording medium built in the reconstruction apparatus PROD_D such as HDD or SSD, may be (2) a type of recording medium connected to the reconstruction apparatus PROD_D such as an SD memory card or a USB flash memory, and may be (3) a type of recording medium loaded in a drive apparatus (not illustrated) built in the reconstruction apparatus PROD_D such as a DVD or a BD.

In addition, the reconstruction apparatus PROD_D may further include a display PROD_D3 that displays a video, an output terminal PROD_D4 for outputting the video to the outside, and a transmitter PROD_D5 that transmits the video, as the supply destinations of the video to be output by the decoder PROD_D2. Although an example configuration that the reconstruction apparatus PROD_D includes all of the constituents is illustrated in FIG. 3(b), some of the constituents may be omitted.

Note that the transmitter PROD_D5 may transmit a video which is not coded or may transmit coded data coded in the coding scheme for transmission different from a coding scheme for recording. In the latter case, an coder (not illustrated) that codes a video in the coding scheme for transmission may be present between the decoder PROD_D2 and the transmitter PROD_D5.

Examples of the reconstruction apparatus PROD_D include, for example, a DVD player, a BD player, an HDD player, and the like (in this case, the output terminal PROD_D4 to which a television receiver, and the like are connected is the main supply destination of videos). In addition, a television receiver (in this case, the display PROD_D3 is the main supply destination of videos), a digital signage (also referred to as an electronic signboard or an electronic bulletin board, and the like, and the display PROD_D3 or the transmitter PROD_D5 is the main supply destination of videos), a desktop PC (in this case, the output terminal PROD_D4 or the transmitter PROD_D5 is the main supply destination of videos), a laptop or tablet PC (in this case, the display PROD_D3 or the transmitter PROD_D5 is the main supply destination of videos), a smartphone (in this case, the display PROD_D3 or the transmitter PROD_D5 is the main supply destination of videos), or the like is an example of the reconstruction apparatus PROD_D.

Realization by Hardware and Realization by Software

Each block of the above-mentioned video decoding apparatus 31 and the video coding apparatus 11 may be realized as a hardware by a logical circuit formed on an integrated circuit (IC chip), or may be realized as a software using a Central Processing Unit (CPU).

In the latter case, each of the above-described apparatuses includes a CPU that executes a command of a program to implement each of functions, a Read Only Memory (ROM) that stores the program, a Random Access Memory (RAM) to which the program is loaded, and a storage apparatus (recording medium), such as a memory, that stores the program and various kinds of data. In addition, an objective of the embodiments of the present invention can be achieved by supplying, to each of the apparatuses, the recording medium that records, in a computer readable form, program codes of a control program (executable program, intermediate code program, source program) of each of the apparatuses that is software for realizing the above-described functions and by reading and executing, by the computer (or a CPU or an MPU), the program codes recorded in the recording medium.

As the recording medium, for example, tapes including a magnetic tape, a cassette tape and the like, discs including a magnetic disc such as a floppy (trade name) disk/a hard disk and an optical disc such as a Compact Disc Read-Only Memory (CD-ROM)/Magneto-Optical disc (MO disc)/Mini Disc (MD)/Digital Versatile Disc (DVD: trade name)/CD Recordable (CD-R)/Blu-ray Disc (trade name), cards such as an IC card (including a memory card)/an optical card, semiconductor memories such as a mask ROM/Erasable Programmable Read-Only Memory (EPROM)/Electrically Erasable and Programmable Read-Only Memory (EEPROM: trade name)/a flash ROM, logical circuits such as a Programmable logic device (PLD) and a Field Programmable Gate Array (FPGA), or the like can be used.

In addition, each of the apparatuses is configured to be connectable to a communication network, and the program codes may be supplied through the communication network. The communication network is required to be capable of transmitting the program codes, but is not restricted to a particular communication network. For example, the Internet, an intranet, an extranet, a Local Area Network (LAN), an Integrated Services Digital Network (ISDN), a Value-Added Network (VAN), a Community Antenna television/Cable Television (CATV) communication network, a Virtual Private Network, a telephone network, a mobile communication network, a satellite communication network, and the like are available. A transmission medium constituting this communication network is also required to be a medium which can transmit a program code, but is not restricted to a particular configuration or type of transmission medium. For example, a wired transmission medium such as Institute of Electrical and Electronic Engineers (IEEE) 1394, a USB, a power line carrier, a cable TV line, a telephone line, an Asymmetric Digital Subscriber Line (ADSL) line, and a wireless transmission medium such as infrared ray of Infrared Data Association (IrDA) or a remote control, BlueTooth (trade name), IEEE 802.11 wireless communication, High Data Rate (HDR), Near Field Communication (NFC), Digital Living Network Alliance (DLNA: trade name), a cellular telephone network, a satellite channel, a terrestrial digital broadcast network are available. Note that the embodiments of the present invention can be also realized in the form of computer data signals embedded in a carrier such that the transmission of the program codes is embodied in electronic transmission.

The embodiments of the present invention are not restricted to the above-described embodiments, and various modifications are possible within the scope of the claims. That is, an embodiment obtained by combining technical means modified appropriately within the scope defined by claims is included in the technical scope of the present invention as well.

INDUSTRIAL APPLICABILITY

The embodiments of the present invention can be preferably applied to a video decoding apparatus that decodes coded data in which image data is coded, and a video coding apparatus that generates coded data in which image data is coded. The embodiments of the present invention can be preferably applied to a data structure of coded data generated by the video coding apparatus and referred to by the video decoding apparatus.

REFERENCE SIGNS LIST

31 Image decoding apparatus
301 Entropy decoder
302 Parameter decoder
3020 Header decoder
303 Inter prediction parameter derivation unit
304 Intra prediction parameter derivation unit
308 Prediction image generation unit
309 Inter prediction image generation unit
310 Intra prediction image generation unit
311 Inverse quantization and inverse transform processing unit
312 Addition unit
11 Image coding apparatus
101 Prediction image generation unit
102 Subtraction unit
103 Transform and quantization unit
104 Entropy coder
105 Inverse quantization and inverse transform processing unit
107 Loop filter
110 Coding parameter determination unit
111 Parameter coder
112 Inter prediction parameter coder
113 Intra prediction parameter coder
1110 Header coder
1111 CT information coder
1113 CU coder (prediction mode coder)
1114 TU coder

The invention claimed is:

1. A video decoding apparatus for decoding a picture in a unit being obtained by splitting the picture with a split type of at least one of a Quad Tree (QT) split, a Binary Tree (BT) split, and a Ternary Tree (TT) split, the video decoding apparatus comprising:
a parameter decoding circuit that decodes, from a coding node, a QT split flag indicating whether the QT split is performed, a direction flag indicating a split direction of a Multi Tree (MT) split, and a type flag indicating the split type of the MT split,
wherein the parameter decoding circuit determines whether a tree type is a DUAL_TREE_CHROMA, whether a width of a chroma block is greater than 4, and whether a multiplication of the width and a height of the chroma block is greater than 32,
the QT split flag is decoded based on at least the tree type not being the DUAL_TREE_CHROMA or the width of the chroma block being greater than 4,
a value of the QT split flag is set to be equal to 0 based on (i) the tree type being the DUAL_TREE_CHROMA and (ii) the width of the chroma block being less than or equal to 4,
the type flag is decoded based on at least the tree type not being the DUAL_TREE_CHROMA or the multiplication of the width and the height of the chroma block is greater than 32,
a value of the type flag is set to be equal to a value indicating the BT split based on (i) the tree type being the DUAL_TREE_CHROMA and (ii) the multiplication of the width and the height of the chroma block being less than or equal to 32,
the coding node is split by the BT split or the TT split based on the direction flag and the type flag, and
the coding node is split by the QT split based on the QT split flag.

2. A video decoding method for decoding a picture in a unit being obtained by splitting the picture with a split type of at least one of a Quad Tree (QT) split, a Binary Tree (BT) split, and a Ternary Tree (TT) split, the video decoding method comprising:
determining whether a tree type is a DUAL TREE CHROMA, whether a width of a chroma block is greater than 4, and whether a multiplication of the width and a height of the chroma block is greater than 32;
decoding, from a coding node, a QT split flag indicating whether the QT split is performed based on at least the tree type not being the DUAL_TREE_CHROMA or the width of the chroma block being greater than 4;

setting a value of the QT split flag to be equal to 0 based on (i) the tree type being the DUAL TREE CHROMA and (ii) the width of the chroma block being less than or equal to 4;

decoding, from the coding node, a direction flag indicating a split direction of a Multi Tree (MT) split;

decoding, from the coding node, the type flag indicating the split type of the MT split based on at least the tree type not being the DUAL TREE CHROMA or the multiplication of the width and the height of the chroma block being greater than 32;

setting a value of the type flag to be equal to a value indicating the BT split based on (i) the tree type being the DUAL TREE CHROMA and (ii) the multiplication of the width and the height of the chroma block being less than or equal to 32;

splitting the coding node by the BT split or the TT split based on the direction flag and the type flag; and splitting the coding node by the QT split based on the QT split flag.

3. A video encoding apparatus for encoding a picture in a unit being obtained by splitting the picture with a split type of at least one of a Quad Tree (QT) split, a Binary Tree (BT) split, and a Ternary Tree (TT) split, the video encoding apparatus comprising:

a parameter encoding circuit that encodes, in a coding node, a QT split flag indicating whether the QT split is performed, a direction flag indicating a split direction of a Multi Tree (MT) split, and a type flag indicating the split type of the MT split, wherein the parameter encoding circuit determines whether a tree type is a DUAL_TREE_CHROMA, whether a width of a chroma block is greater than 4, and whether a multiplication of the width and a height of the chroma block is greater than 32, the QT split flag is encoded based on at least the tree type not being the DUAL_TREE_CHROMA or the width of the chroma block being greater than 4, a value of the QT split flag is set to be equal to 0 based on (i) the tree type being the DUAL_TREE_CHROMA and (ii) the width of the chroma block being less than or equal to 4, the type flag is decoded based on at least the tree type not being the DUAL_TREE_CHROMA or the multiplication of the width and the height of the chroma block is greater than 32, a value of the type flag is set to be equal to a value indicating the BT split based on (i) the tree type being the DUAL_TREE_CHROMA and (ii) the multiplication of the width and the height of the chroma block being less than or equal to 32, the coding node is split by the BT split or the TT split based on the direction flag and the type flag, and the coding node is split by the QT split based on the QT split flag.

* * * * *